United States Patent [19]
Kida

[11] Patent Number: 6,049,392
[45] Date of Patent: *Apr. 11, 2000

[54] PRINT PRODUCTION SYSTEM FOR PHOTOGRAPHIC DOCUMENT

[75] Inventor: Akira Kida, Hino, Japan

[73] Assignee: Konica Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/834,711

[22] Filed: Apr. 1, 1997

[30] Foreign Application Priority Data

| Apr. 5, 1996 | [JP] | Japan | ................................. 8-084072 |
| Apr. 5, 1996 | [JP] | Japan | ................................. 8-084073 |

[51] Int. Cl.$^7$ .............................. B41B 15/00; G06F 15/00
[52] U.S. Cl. ....................... 358/1.17; 358/296; 358/444; 358/487; 355/18; 355/40; 355/41; 355/54
[58] Field of Search ................................. 355/18, 40, 41, 355/54; 358/296, 444, 487, 1.17; 395/116

[56] References Cited

U.S. PATENT DOCUMENTS

| 4,845,551 | 7/1989 | Matsumoto | 358/506 |
| 4,937,615 | 6/1990 | Tokuda | 355/35 |
| 4,937,617 | 6/1990 | Kito | 355/41 |
| 4,961,086 | 10/1990 | Takenaka | 355/41 |
| 4,975,736 | 12/1990 | Kito et al. | 355/77 |
| 4,990,950 | 2/1991 | Tokuda | 355/38 |
| 5,440,403 | 8/1995 | Hashimoto | 358/444 |
| 5,477,353 | 12/1995 | Yamasaki | 358/487 |
| 5,617,180 | 4/1997 | Yoshikawa | 355/40 |
| 5,629,753 | 5/1997 | Akira | 355/40 |
| 5,678,111 | 10/1997 | Matsumoto | 396/564 |
| 5,729,326 | 3/1998 | Yamada | 355/40 |
| 5,739,924 | 4/1998 | Sano | 358/487 |
| 5,745,220 | 4/1998 | Okazaki et al. | 355/54 |
| 5,777,723 | 7/1998 | Iwasaki et al. | 655/67 |

FOREIGN PATENT DOCUMENTS

| 0532047 A2 | 3/1993 | European Pat. Off. . |
| 4323630 A1 | 1/1995 | Germany . |

*Primary Examiner*—Andrew W. Johns
*Assistant Examiner*—Gregory Desire
*Attorney, Agent, or Firm*—Frishauf, Holtz, Goodman, Langer & Chick, P.C.

[57] ABSTRACT

A printing system for printing an image of a photographic film having an identification code onto a photosensitive material comprises a first reading device for reading the identification code; a second reading device for reading image information on the photographic film; a first inputting device for inputting a first correction data for the image information read by the second reading device; a second inputting device for inputting a second correction data for the image information read by the second reading device; a third reading device for reading the identification code from the photographic film; a printing device for printing the image of the photographic film onto the photosensitive material; and a control device for controlling the printing device on the basis of the correction data corresponding to the identification code read by the third reading device.

5 Claims, 7 Drawing Sheets

PRINT PRODUCTION SYSTEM FOR PHOTOGRAPHIC DOCUMENT

BACKGROUND OF THE INVENTION

The present invention relates to a print production system for a photographic document.

Generally, a conventional print production system for a photographic document in a small laboratory such as a mini-lab, comprises: an image reading means for obtaining an electronic image by imagewise reading a photographic document; an image display means for displaying a reproduced image of the photographic document which has been read imagewise by the image reading means; a instruction input means for inputting a instruction for a printing condition of the photographic document whose reproduced image has been displayed by the image display means; and a printing means for printing an image onto a printing photographic material from the photographic document, read imagewise by the image reading means, according to a instruction, inputted by the instruction input means, for the printing conditions for the photographic document whose reproduced image has been displayed by the image display means. Generally, a large photographic laboratory has a plurality of these print production systems.

In a conventional print production system, one image display means and one instruction input means are respectively provided for one image reading means and one printing means, and one operator to judge an image, is in charge of the complete operation.

However, there are cases in which the instruction for the printing conditions can not be quickly inputted into the system, depending on the photographic document. In such cases, there is a problem in which printing is delayed by time, during which the operator is worried about input regarding the instruction of printing conditions. Therefore, the printing amount per unit time, or the amount of instruction input per unit time is decreased.

A first object of the present invention is to eliminate or reduce a delay of the printing in a case where the instruction for a printing condition can not quickly input to the system.

Incidentally, recently, it has been desired to achieve cast reductions in order to lower the print price. Accordingly, various types of image evaluation techniques have been developed for unmanned image evaluation. However, a technique for unmanned image evaluation which maintains a high quality level and a high yield in print production has not yet been developed.

Accordingly, the second objective of the present invention is to reduce a member of operators in charge of the image evaluation, thereby reducing labor costs.

SUMMARY OF THE INVENTION

The above objects of the present invention are attained by the belowmentioned items. Firstly, terms common to the items will be described below.
[Explanation of Terms]

A CRT monitor, a liquid crystal monitor, or a similar apparatus is listed as an example of an image display means, however, it is not limited to these apparatuses. Further, the image display means may have a plurality of display screens, or may have only one display screen. Still further, the image display means may display a plurality of image frames. or only one image frame. Yet further, it may display only a reproduced image of the image frame, or a reference image for the reference, other than the reproduced image of the image frame. Furthermore, the display means may display the reproduced image of the image frames belonging to a plurality of orders, however, it is preferable to display only the reproduced image of the image frame belonging to one order. When the display means displays the reproduced images of the image frames belonging to a plurality of orders, it is preferable to show a partition between orders. Further, when a plurality of orders of the same customer are processed, the reproduced images of the image frames belonging to the plural orders of the same customer may be simultaneously displayed.

Supply of the photographic document from the image reading means to the corresponding printing means, may be carried out by conveying automatically, or manually. When the photographic document is supplied manually, it is preferable that: the photographic document read imagewise by the image reading means is wound, or accommodated in a container, and then, the photographic document, wound or accommodated in the container, is manually supplied to the printing means.

In order to allocate the electronic image into one of a plurality of image display means by an allocation means, not only a method to send the electronic image to only one image display means, is used, but also, of course, a method is used, in which the electronic image is sent to all image display means, and a non-display signal is sent to the image display means except one.

A recording medium such as a hard disk, MO, magnetic recording tape, or a similar device, other than a memory, can also be used as an image storage means. In the image storage means, an electronic image from the first image reading means, and the electronic image from the second image reading means may also be stored in the same storage medium or the same recording medium, or in another storage medium or recording medium.

As a printing condition instruction information storage means, a recording medium such as a hard disk, MO, magnetic recording tape, etc., may also be used other than a memory. In the case of a print production system provided with the first printing means and the second printing means, the printing condition instruction information storage means may be structured in such a manner that printing condition instruction information to the photographic document, to be printed by the first printing means, and the printing condition instruction information to the photographic document, to be printed by the second printing means, may also be stored in the same storage medium or the same recording medium, or another storage medium or recording medium.

As a printing condition determining means, a means in which the printing condition is determined by a CPU, or a means in which the printing condition is determined by an arithmetic circuit, is listed, however, the printing condition determining means is not limited to them. Further, in the case of the print production system provided with the first printing means and the second printing means, the printing condition determining means may be structured in such a manner that the printing condition for the photographic document to be printed by the first printing means, and the printing condition for the photographic document to be printed by the second printing means, may also be determined by the same CPU or arithmetic circuit, or another CPU or arithmetic circuit.

A printing condition information storage means, a recording medium such as a hard disk, MO, magnetic recording tape, etc., may also be used other than a memory. In the case of a print production system provided with the first printing means and the second printing means, the printing condition information storage means may be structured in such a manner that printing condition information for the photographic document, to be printed by the first printing means, and the printing condition information for the photographic document, to be printed by the second printing means, may also be stored in the same storage medium or recording medium, or another storage medium or recording medium.

An image formation order discrimination means (including the first image formation order discrimination means and the second image formation order discrimination means) may be a means by which order discrimination information is obtained to discriminate the order of the photographic document, read imagewise by the image reading means (including the first image reading means and the second image reading means). In the case where order information is magnetically recorded in the photographic document, it is preferable to read the order information by a magnetic reading apparatus. In the case where the order information is optically recorded in the photographic document by using a seal, on which codes such as a bar code are printed, or by optical printing, it is preferable to read the order information by an optical reading apparatus. Further, in the case where the order discrimination information and conveyance position information are controlled by a central control apparatus, it is preferable to read the order discrimination information of the photographic document, positioned in the image reading means, by the central control apparatus.

A printing order discrimination means (including the first printing order discrimination means and the second printing order discrimination means) may be a means by which order discrimination information is obtained to discriminate the order of the photographic document to be printed by the printing means (including the first printing means and the second printing means). In the case where order information is magnetically recorded in the photographic document, it is preferable to read the order information by a magnetic reading apparatus. In the case where the order information is optically recorded in the photographic document by using a seal, on which codes such as a bar code are printed, or by optical printing, it is preferable to read the order information by an optical reading apparatus. Further, in the case where the order discrimination information and conveyance position information are controlled by a central control apparatus, it is preferable to read the order discrimination information of the photographic document, positioned in the printing means, by the central control apparatus.

An image formation image frame discrimination means (including the first image formation image frame discrimination means and the second image formation image frame discrimination means) may be a means by which an image frame discrimination information is obtained to discriminate the image frame of the photographic document to be read imagewise by the image reading means (including the first image reading means and the second image reading means). In the case where image frame information is magnetically recorded in the photographic document, it is preferable to read the image frame information by a magnetic reading apparatus. In the case where the image frame information is optically recorded in the photographic document by optically printing frame number codes, or the like, it is preferable to read the image frame information by an optical reading apparatus. Further, the image frame discrimination information and conveyance position information are controlled by a central control apparatus, it is preferable to read the image frame discrimination information of the photographic document, positioned in the image reading means, by the central control apparatus. Further, In the case where the photographic document is a 135 photographic film, frame number codes are printed on the side edge portion of the photographic film. and accordingly, it is preferable to obtain the image frame information by reading the frame number codes by the optical reading apparatus. Still further, the image frame may be discriminated by distance information from the reference position such as a leading edge or the trailing edge of each photographic document. In such a case, the image formation image frame discrimination means may be a means to obtain the distance information from the reference position.

A printing image frame discrimination means (including the first printing image frame discrimination means and the second printing image frame discrimination means) may be a means by which an image frame discrimination information is obtained to discriminate the image frame of the photographic document to be printed by the printing means. In the case where image frame information is magnetically recorded in the photographic document, it is preferable to read the image frame information by a magnetic reading apparatus. In the case where the image frame information is optically recorded in the photographic document by using a seal on which codes such as a bar code are printed, or by optical printing, it is preferable to read the image frame information by an optical reading apparatus. Further, in the case where the image frame discrimination information and conveyance position information are controlled by a central control apparatus, it is preferable to read the image frame discrimination information of the photographic document, positioned in the image reading means, by the central control apparatus. Further, in the case where the photographic document is a 135 photographic film, frame number codes are printed on the side edge portion of the photographic film, and accordingly, it is preferable to obtain the image frame information by reading the frame number codes by the optical reading apparatus. Still further, the image frame may be discriminated by distance information from the reference position such as a leading edge or the trailing edge of each photographic document. In such a case, the first printing image frame discrimination means, or the second printing image frame discrimination means may be a means to obtain the distance information from the reference position.

The input speed of instruction concerning to the printing condition from the instruction input means, is defined as an amount in which the instruction concerning to the printing condition is inputted from the instruction input means per unit time. In this case, as the amount, the following are listed: the number of orders for which the instruction about the printing condition is inputted from the instruction input means, the number of image frames, the required amount of memory for the electronic image, corresponding to the input of the instruction about printing condition from the instruction input means, the total of the number of ordered sheets for printing, of the image frame for which the instruction about the printing condition is inputted from the instruction input means, etc.

Predicted waiting time means the time, predicted to pass until the instruction about the printing condition is inputted from the instruction input means for a newly allocated electronic image. This predicted waiting time is determined from the speed to input the instruction about the printing condition from the instruction input means, and an amount of electronic images, for which the instruction about the printing condition is not inputted yet by the instruction input means, in which the instruction about the printing condition is stored in the image storage means provided for each image display means, however, the predicted waiting time is not limited to the above description.

An expected value is one used in the probability.

Structure To Attain The First Objective

1. A print production system comprises an image reading means for obtaining an electric image by reading a photographic document;

an allocating means for allcating the electric image to either one of a plurality of image display means;

the plurality of image display means for displaying a reproduced image of the photographic document taken imagewise by the image reading means on the basis of the electric image allocated by the allocating means;

an instruction input means provided for each image display means and inputting an instruction concerning a printing condition for the photographic document whose reproduced image is displayed by the image display means;

a printing means for printing the photographic document image read imagewise by the image reading means onto a printing photosensitive material on the basis of the instruction concerning the printing condition inputted by the instruction input means for the photographic document whose reproduced image is displayed by the image display means.

With the print production system in item 1, since there are provided the plurality of image display means and the instruction input means for each image display means, a plurality of opeators can share to input instructions as printing conditions for the photographic document. Accordingly, when one operator could not input an instruction as to a printing condition smoothly, during such the time period, another operator can input an instruction as to a printing condition for another photographic document other than the photographic document to which an instruction as to the printing condition could not be inputted smoothly. Therefore, by the time that an input operation to input an instruction for the photographic document to which the instruction could not be inputted smoothly has been completed, the printing can be conducted continuously smoothly. As a result, a printing delay in the case that an instruction as to the printing condition could not be inputted smoothly can be avoided or minimized and an expectation value as a whole for a printing amount or amount of inputted instructions per unit time can be increased.

2. The print production system described in item 1 is characterized in further comprising a printing condition instruction information memory means for memorizing printing condition instruction information as to instruction concerning the printing condition inputted by the plurality of instruction input means, wherein the printing means conducts printing on the basis of the printing condition instruction information memorized in the printing condition instruction information memory.

With the print production system in item 2, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced.

3. The print production system described in item 1 or 2 is characterized in further comprising printing condition determining means for obtaining a printing condition on the basis of the instruction concerning the printing condition inputted by the plurality of instruction input means; and printing condition instruction information memory means for memorizing the printing condition information determined by the printing condition determining means, wherein the printing means conducts printing on the basis of the printing condition instruction information memorized in the printing condition instruction information memory.

With the print production system in item 3, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced.

Incidentally, when obtaining a printing condition, it is preferable that to seek the printing condition by using information of an electric image allocated to the other image display means makes common data base so that an amount of information can be increased.

4. The print production system described in one of items 1 to 3 is characterized in further comprising image memory means for memorizing the electric image from the image reading means, wherein the allocating means allocating the electric image memorized by the image memory means.

With the print production system in item 4, since the electric image from the image reading means can be memorized, a spare time can be obtained between the image reading and the displaying of the reproduced image. Therefore, even if a judging period of times for each frame or each order fluctuates, since it is not necessary to conduct a next image reading after the judgment, a smooth continuous image reading can be conducted.

5. The print production system described in item 4 is characterized in that the allocating means allocates the electric image belonging in the same order memorized in the image memory means into either one of the plurality of image display means.

With the print production system in item 5, an event that plural operators input an instruction concerning a printing condition for the same order, resulting in a density or a color tone of a print may fluctuate due to a different instruction for the same order can be avoided, and information administration per each order as a unit can be conducted easily.

6. The print production system described in item 5 is characterized in that when an instruction input means among the plurality of instruction input means completed to input an instruction concerning the printing condition for the photographic document belonging to the same order, the allocating means allocates an electric image belonging to a different order memorized in the image memory means to the image display means corresponding to the instruction input means.

With the print production system in item 6, since a reproduced image of the photographic document belonging to the different order is displayed after the inputting of the instruction concerning the printing condition for the photographic document beloging to the same order has been completed, on the succesive process, information administration per each order as a unit can be conducted easily.

7. The print production system described in one of items 1 to 5 is characterized in that the image memory means comprises for each of the image display means an image memory means for memorizing an electric image allocated by the allocating means and the image display means displays the reproduced image of the photographic document based on the electric image memorized by the corresponding image memory means.

With the print production system in item 7, since the electric image from the allocating means can be memorized, a spare time can be obtained between the image reading and the displaying of the reproduced image. Therefore, even if a judging period of times for each frame or each order fluctuates, since it is not necessary to conduct a next image reading after the judgment, a smooth continuous image reading can be conducted.

8. The print production system described in item 7 is characterized in that the allocaing means allocates the electric image obtained by the image reading means into an image display means among the plurality of image display means so that a total amount of inputted instruction per unit time becomes the maximum.

With the print production system in item 8, an expectation value for the total amount of inputted instruction per unit time can be increased.

9. The print production system described in item 7 or 8 is characterized in that the allocaing means allocates preferentially the electric image obtained by the image reading means into an image memory means among the plurality of image memory means in which an electric image to which an instruction concerning the printing condition is not inputted by the instruction input means is not memorized.

With the print production system in item 9, the electric image is allocated more appropriately. As a result, an event that an instruction concerning the printing condition from a printing condition instruction input means among the plurality of the printing condition instruction input means is faster and that from another printing condition instruction input means is delayed can be made not to occur easily, and an expectation value for the total amount of inputted instruction per unit time can be increased.

10. The print production system described in one of items 7 to 9 is characterized in that the allocaing means allocates the electric image obtained by the image reading means into either one of the plurality of image display means in accordance with amount of an electric image memorized in the image memory means to which an instruction concerning the printing condition is not yet inputted by the instruction input means.

With the print production system in item 10, the electric image is allocated more appropriately. As a result, an event that an instruction concerning the printing condition from a printing condition instruction input means among the plurality of the printing condition instruction input means is faster and that from another printing condition instruction input means is delayed can be made not to occur easily, and an expectation value for the total amount of inputted instruction per unit time can be increased.

11. The print production system described in one of items 7 to 10 is characterized in that the allocaing means allocates the electric image obtained by the image reading means into either one of the plurality of image display means in accordance with amount of an electric image memorized in the image memory means to which an instruction concerning the printing condition is not yet inputted by the instruction input means.

With the print production system in item 11, the electric image is allocated more appropriately. As a result, an event that an instruction concerning the printing condition from a printing condition instruction input means among the plurality of the printing condition instruction input means is faster and that from another printing condition instruction input means is delayed can be made not to occur easily, and an expectation value for the total amount of inputted instruction per unit time can be increased.

12. The print production system described in one of items 7 to 11 is characterized in that the allocating means allocates the electric image obtained by the image reading means into either one of the plurality of image display means in accordance with a expected waiting time necessary for the instruction input means to input an instruction concerning a printing condition for a newly allocated electric image.

With the print production system in item 12, the electric image is allocated more appropriately. As a result, an event that an instruction concerning the printing condition from a printing condition instruction input means among the plurality of the printing condition instruction input means is faster and that from another printing condition instruction input means is delayed can be made not to occur easily, and an expectation value for the total amount of inputted instruction per unit time can be increased.

13. The print production system described in one of items 7 to 12 is characterized in that each instruction input means sends situation information as to its availability and the allocating means does not allocate the electric image for the image display means corresponding to the instruciton input means which is not available for the electric image.

With the print production system in item 13, in the case that an operator can not input an instruction because the operator goes away from the desk or the instruction input means or the image display means corresponding to the instruction input means can not be available, the allocating means does not allocate the electric image to the image display means corresponding to the nonavailable instruction input means. Accordingly, an event that the judgment has not been made for a long time because the electric image is allocated to the image display means corresponding to the nonavailable instruction input means can be avoided, and an expectation value for the total amount of inputted instruction per unit time can be increased.

14. The print production system described in one of items 4 to 13 is characterized in further comprising an image reading order identifying means for obtaining order identification information to identify an oder of the photographic document to be read by the image reading means, wherein the image memory means memorizes the electric image from the image reading means together with the order identification information obtained by the image reading order identifying means for each order, the electric image of one order is selected from the electric image of plural orders memorized in the image memory means and the image display means displays the reproduced image of the photographic image on the basis of the electric image of the selected one order.

With the print production system in item 13, the electric image can be administrated for each oder as a unit.

15. The print production system described in item 14 is characterized in further comprising printing condition instruction information memory means for memorizing printing condition instruction information of plural orders concerning an instruction concerning a printing condition inputted by the instruction input means together with the order identification information; and a printing order identifying means for obtaining order identification information of the photographic document to be printed by the printing means, wherein the printing means selects the printing condition instruction information of the belonging oder of the photographic document to be printed by the printing means from the printing condition instruction information of the plural orders memorized in the printing condition instruction information memory means by the printing order identification information obtained by the printing order identifying means and conducts the printing on the basis of the selected printing condition instruction information.

With the print production system in item 15, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

16. The print production system described in item 14 is characterized in further comprising printing condition determining means for obtaining a printing condition from printing condition instruction information concerning the instruction concerning the printing condition inputted by the instruction input means; printing condition instruction information memory means for memorizing printing condition instruction information of plural orders concerning the printing condition determined by the printing condition determining means together with the order identification information and a printing order identifying means for obtaining order identification information of the photographic document to be printed by the printing means, wherein the printing means selects the printing condition information of the order of the photographic document to be printed by the printing means from the printing condition information of the plural orders memorized in the printing condition information memory means by the printing order identification information obtained by the printing order identifying means and conducts the printing on the basis of the selected printing condition instruction information.

With the print production system in item 16, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

Incidentally, when obtaining a printing condition, it is preferable that to seek the printing condition by using information of an electric image allocated to the other image display means makes common data base so that an amount of information can be increased.

17. The print production system described in one of items 4 to 16 is characterized in further comprising a read image frame identifying means for obtaining image frame identification information to identify an image frame of the photographic document read by the image reading means; a printing condition instruction information memory means for memorizing printing condition instruction information concerning an instruction as to the printing condition inputted by the instruction input means together with the image frame identification information; and a printed image frame identification means for obtaining image frame identification information of the photographic document to be printed by the printing means, wherein the image memory memorizes the electric image from the image reading means for each image frame together with the image frame identification information obtained by the read image frame identifying means; and the printing means selects a printing condition instruction information of an image frame of the photographic document to be printed from the printing condition instruction information memorized in the printing condition instruction information memorizing means by the image frame identification information obtained by the printed image frame identifying means and conducts the printing on the basis of the selected printing condition instruction information.

With the print production system in item 17, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

18. The print production system described in one of items 4 to 16 is characterized in further comprising a read image frame identifying means for obtaining image frame identification information to identify an image frame of the photographic document read by the image reading means; a printing condition determining means for obtaining a printing condition from the printing condition instruction information concerning an instruction as to the printing condition inputted by the instruction input means; a printing condition information memory means for memorizing the printing condition obtained by the printing condition determining means together with the image frame identification information; and a printed image frame identification means for obtaining image frame identification information of the photographic document to be printed by the printing means, wherein the image memory memorizes the electric image from the image reading means for each image frame together with the image frame identification information obtained by the read image frame identifying means; and the printing means selects a printing condition instruction information of an image frame of the photographic document to be printed from the printing condition instruction information memorized in the printing condition instruction information memorizing means by the image frame identification information obtained by the printed image frame identifying means and conducts the printing on the basis of the selected printing condition instruction information.

With the print production system in item 18, since the printing condition information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

Incidentally, when obtaining a printing condition, it is preferable that to seek the printing condition by using information of an electric image allocated to the other image display means makes common data base so that an amount of information can be increased.

19. A print production system comprises
an image reading means for obtaining an electric image by reading a photographic document;
an allocating means for allcating the electric image to either one of a plurality of image display means;
the plurality of image display means for displaying a reproduced image of the photographic document taken imagewise by the image reading means on the basis of the electric image allocated by the allocating means;
an instruction input means provided for each image display means and inputting an instruction concerning a printing condition for the photographic document whose reproduced image is displayed by the image display means;
a plurality of printing means for printing the photographic document image read imagewise by any image reading means of the plurality of printing means onto a printing photosensitive material on the basis of the instruction concerning the printing condition inputted by the instruction input means for the photographic document read by any image reading means of the plurality of printing means.

With the print production system in item 19, since there are provided the plurality of image display means and the instruction input means for each image display means, a plurality of opeators can share to input instructions as printing conditions for the photographic document. Accordingly, when one operator could not input an instruction as to a printing condition smoothly, during such the time period, another operator can input an instruction as to a printing condition for another photographic document other than the photographic document to which an instruction as to the printing condition could not be inputted smoothly. Therefore, by the time that an input operation to input an instruction for the photographic document to which the instruction could not be inputted smoothly has been completed, the printing can be conducted continuously smoothly. As a result, a printing delay in the case that an instruction as to the printing condition could not be inputted smoothly can be avoided or minimized.

20. The print production system described in item 19 is characterized in that the allocaing means allocates the electric image obtained by the image reading means into an imag display means among the plurality of image display means so that a total amount of inputted instruction per unit time becomes the maximum.

With the print production system in item 8, an expectation value for the total amount of inputted instruction per unit time can be increased.

21. A print production system comprises a first image reading means for obtaining an electric image by reading a photographic document;

a second image reading means for obtaining an electric image by reading a photographic document;
an allocating means for allcating the electric image obtained by the first image reading means and the electric image obtained by the second image reading means to either one of a plurality of image display means;
the plurality of image display means for displaying a reproduced image of the photographic document read imagewise by the image reading means on the basis of the electric image allocated by the allocating means;
an instruction input means provided for each image display means and inputting an instruction concerning a printing condition for the photographic document whose reproduced image is displayed by the image display means;
a first printing means for printing the photographic document read imagewise by the first image reading means onto a printing photosensitive material on the basis of the instruction concerning the printing condition inputted by the instruction input means for the photographic document read by the first image reading means; and
a second printing means for printing the photographic document read imagewise by the second image reading means onto a printing photosensitive material on the basis of the instruction concerning the printing condition inputted by the instruction input means for the photographic document read by the second image reading means.

With the print production system in item 21, since there are provided the plurality of image display means and the instruction input means for each image display means, a plurality of opeators can share to input instructions as printing conditions for the photographic document. Accordingly, when one operator could not input an instruction as to a printing condition smoothly, during such the time period, another operator can input an instruction as to a printing condition for another photographic document other than the photographic document to which an instruction as to the printing condition could not be inputted smoothly. Therefore, by the time that an input operation to input an instruction for the photographic document to which the instruction could not be inputted smoothly has been completed, the printing can be conducted continuously smoothly. As a result, a printing delay in the case that an instruction as to the printing condition could not be inputted smoothly can be avoided or minimized.

22. The print production system described in item 21 is characterized in further comprising a printing condition instruction information memory means for memorizing printing condition instruction information as to instruction cocerning the printing condition inputted by the plurality of instruction input means, wherein the first printing means prints the photographic document read by the first image reading means onto a printing photosensitive material on the basis of the instruction concerning the printing condition memorized in the printing condition instruction information memory for the photographic document read by the first image reading means, and the second printing means prints the photographic document read by the second image reading means onto a printing photosensitive material on the basis of the instruction concerning the printing condition memorized in the printing condition instruction information memory for the photographic document read by the second image reading means.

With the print production system in item 22, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced.

23. The print production system described in item 21 or 22 is characterized in further comprising printing condition determining means for obtaining a printing condition on the basis of the instruction concerning the printing condition inputted by the plurality of instruction input means; and printing condition instruction information memory means for memorizing the printing condition information determined by the printing condition determining means, wherein the first printing means prints the photographic document read by the first image reading means onto a printing photosensitive material on the basis of the instruction concerning the printing condition memorized in the printing condition instruction information memory for the photographic document read by the first image reading means, and the second printing means prints the photographic document read by the second image reading means onto a printing photosensitive material on the basis of the instruction concerning the printing condition memorized in the printing condition instruction information memory for the photographic document read by the second image reading means.

With the print production system in item 23, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced.

Incidentally, when obtaining a printing condition, it is preferable that to seek the printing condition by using information of an electric image allocated to the other image display means makes common data base so that an amount of information can be increased.

24. The print production system described in one of items 21 to 23 is characterized in further comprising image memory means for memorizing the electric image from the image reading means, wherein the allocating means allocating the electric image memorized by the image memory means.

With the print production system in item 24, since the electric image from the image reading means can be memorized, a spare time can be obtained between the image reading and the displaying of the reproduced image. Therefore, even if a judging period of times for each frame or each order fluctuates, since it is not necessary to conduct a next image reading after the judgment, a smooth continuous image reading can be conducted.

25. The print production system described in item 24 is characterized in that the allocating means allocates the electric image belonging in the same order memorized in the image memory means into either one of the plurality of image display means.

With the print production system in item 25, an event that plural operators input an instruction concerning a printing condition for the same order, resulting in a density or a color tone of a print may fluctuate due to a different instruction for the same order can be avoided, and information administration per each order as a unit can be conducted easily.

26. The print production system described in item 25 is characterized in that when an instruction input means among the plurality of instruction input means completed to input an instruction concerning the printing condition for the photographic document belonging to the same order, the allocating means allocates an electric image belonging to a different order memorized in the image memory means to the image display means corresponding to the instruction input means.

With the print production system in item 26, since a reproduced image of the photographic document belonging to the different order is displayed after the inputting of the instruction concerning the printing condition for the photographic document belonging to the same order has been completed, on the succesive process, information administration per each order as a unit can be conducted easily.

27. The print production system described in one of items 21 to 25 is characterized in that the image memory means comprises for each of the image display means an image memory means for memorizing an electric image allocated by the allocating means and the image display means displays the reproduced image of the photographic document based on the electric image memorized by the corresponding image memory means.

With the print production system in item 27, since the electric image from the allocating means can be memorized, spare time can be obtained between the image reading and the displaying of the reproduced image. Therefore, even if a judging period of times for each frame or each order fluctuates, since it is not necessary to conduct a next image reading after the judgment, a smooth continuous image reading can be conducted.

28. The print production system described in item 27 is characterized in that the allocaing means allocates the electric image obtained by the image reading means into an imag display means among the plurality of image display means so that a total amount of inputted instruction per unit time becomes the maximum.

With the print production system in item 28, an expectation value for the total amount of inputted instruction per unit time can be increased.

29. The print production system described in item 27 or 28 is characterized in that the allocaing means allocates preferentially the electric image obtained by the image reading means into an image memory means among the plurality of image memory means in which an electric image to which an instruction concerning the printing condition is not inputted by the instruction input means is not memorized.

With the print production system in item 29, the electric image is allocated more appropriately. As a result, an event that an instruction concerning the printing condition from a printing condition instruction input means among the plurality of the printing condition instruction input means is faster and that from another printing condition instruction input means is delayed can be made not to occur easily, and an expectation value for the total amount of inputted instruction per unit time can be increased.

30. The print production system described in one of items 27 to 29 is characterized in that the allocaing means allocates the electric image obtained by the image reading means into either one of the plurality of image display means in accordance with amount of an electric image memorized in the image memory means to which an instruction concerning the printing condition is not yet inputted by the instruction input means.

With the print production system in item 30, the electric image is allocated more appropriately. As a result, an event that an instruction concerning the printing condition from a printing condition instruction input means among the plurality of the printing condition instruction input means is faster and that from another printing condition instruction input means is delayed can be made not to occur easily, and an expectation value for the total amount of inputted instruction per unit time can be increased.

31. The print production system described in one of items 27 to 30 is characterized in that the allocaing means allocates the electric image obtained by the image reading means into either one of the plurality of image display means in accordance with amount of an electric image memorized in the image memory means to which an instruction concerning the printing condition is not yet inputted by the instruction input means.

With the print production system in item 31, the electric image is allocated more appropriately. As a result, an event that an instruction concerning the printing condition from a printing condition instruction input means among the plurality of the printing condition instruction input means is faster and that from another printing condition instruction input means is delayed can be made not to occur easily, and an expectation value for the total amount of inputted instruction per unit time can be increased.

32. The print production system described in one of items 27 to 31 is characterized in that the allocaing means allocates the electric image obtained by the image reading means into either one of the plurality of image display means in accordance with a expected waiting time necessary for the instruction input means to input an instruction concerning a printing condition for a newly allocated electric image.

With the print production system in item 32, the electric image is allocated more appropriately. As a result, an event that an instruction concerning the printing condition from a printing condition instruction input means among the plurality of the printing condition instruction input means is faster and that from another printing condition instruction input means is delayed can be made not to occur easily, and an expectation value for the total amount of inputted instruction per unit time can be increased.

33. The print production system described in one of items 27 to 32 is characterized in that each instruction input means sends situation information as to its availability and the allocating means does not allocate the electric image for the image display means corresponding to the instruciton input means which is not available for the electric image.

With the print production system in item 33, in the case that an operator can not input an instruction because the operator goes away from the desk or the instruction input means or the image display means corresponding to the instruction input means can not be available, the allocating means does not allocate the electric image to the image display means corresponding to the nonavailable instruction input means. Accordingly, an event that the judgment has not been made for a long time because the electric image is allocated to the image display means corresponding to the nonavailable instruction input means can be avoided, and an expectation value for the total amount of inputted instruction per unit time can be increased.

34. The print production system described in one of items 24 to 33 is characterized in further comprising an image reading order identifying means for obtaining order identification information to identify an oder of the photographic document to be read by the image reading means, wherein the image memory means memorizes the electric image from the image reading means together with the order identification information obtained by the image reading order identifying means for each order, the electric image of one order is selected from the electric image of plural orders memorized in the image memory means and the image display means displays the reproduced image of the photographic image on the basis of the electric image of the selected one order.

With the print production system in item 33, the electric image can be administrated for each oder as a unit.

35. The print production system described in item 34 is characterized in further comprising a printing condition instruction information memory means for memorizing printing condition instruction information of plural orders concerning an instruction concerning a printing condition inputted by the instruction input means together with the order identification information;

a first printing order identifying means for obtaining order identification information of the photographic document to be printed by the first printing means; and a second printing order identifying means for obtaining order identification information of the photographic document to be printed by the second printing means; wherein the first printing means selects the printing condition instruction information of the belonging oder of the photographic document to be printed by the first printing means from the printing condition instruction information of the plural orders memorized in the printing condition instruction information memory means by the printing order identification information obtained by the first printing order identifying means and conducts the printing on the basis of the selected printing condition instruction information, and the second printing means selects the printing condition instruction information of the belonging oder of the photographic document to be printed by the second printing means from the printing condition instruction information of the plural orders memorized in the printing condition instruction information memory means by the printing order identification information obtained by the second printing order identifying means and conducts the printing on the basis of the selected printing condition instruction information.

With the print production system in item 35, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

36. The print production system described in item 34 is characterized in further comprising a printing condition determining means for obtaining a printing condition from printing condition instruction information concerning the instruction concerning the printing condition inputted by the instruction input means;

a printing condition instruction information memory means for memorizing printing condition instruction information of plural orders concerning the printing condition determined by the printing condition determining means together with the order identification information;

a first printing order identifying means for obtaining order identification information of the photographic document to be printed by the first printing means; and a second printing order identifying means for obtaining order identification information of the photographic document to be printed by the second printing means, wherein the first printing means selects the printing condition information of the order of the photographic document to be printed by the first printing means from the printing condition information of the plural orders memorized in the printing condition information memory means by the printing order identification information obtained by the first printing order identifying means and conducts the printing on the basis of the selected printing condition instruction information, and the second printing means selects the printing condition information of the order of the photographic document to be printed by the second printing means from the printing condition information of the plural orders memorized in the printing condition information memory means by the printing order identification information obtained by the second printing order identifying means and conducts the printing on the basis of the selected printing condition instruction information.

With the print production system in item 36, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

Incidentally, when obtaining a printing condition, it is preferable that to seek the printing condition by using information of an electric image allocated to the other image display means makes common data base so that an amount of information can be increased.

37. The print production system described in one of items 24 to 36 is characterized in further comprising a first read image frame identifying means for obtaining image frame identification information to identify an image frame of the photographic document read by the first image reading means;

a second read image frame identifying means for obtaining image frame identification information to identify an image frame of the photographic document read by the second image reading means;

a printing condition instruction information memory means for memorizing printing condition instruction information concerning an instruction as to the printing condition inputted by the instruction input means together with the image frame identification information;

a first printed image frame identification means for obtaining image frame identification information of the photographic document to be printed by the first printing means; and a second printed image frame identification means for obtaining image frame identification information of the photographic document to be printed by the second printing means;

wherein the image memory memorizes the electric image from the image reading means for each image frame together with the image frame identification information obtained by the read image frame identifying means; the first printing means selects a printing condition instruction information of an image frame of the photographic document to be printed from the printing condition instruction information memorized in the printing condition instruction information memorizing means by the image frame identification information obtained by the first printed image frame identifying means and conducts the printing on the basis of the selected printing condition instruction information, and the second printing means selects a printing condition instruction information of an image frame of the photographic document to be printed from the printing condition instruction information memorized in the printing condition instruction information memorizing means by the image frame identification information obtained by the second printed image frame identifying means and conducts the printing on the basis of the selected printing condition instruction information.

With the print production system in item 37, since the printing condition instruction information can be memorized, a spare time can be obtained between the input for the instruction as to a printing condition and the printing. Therefore, even if a judging period of times for each frame or each order fluctuates, since the printing can be conducted based on the previously judged results, a occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

38. The print production system described in one of items 24 to 36 is characterized in further comprising a first read image frame identifying means for obtaining image frame identification information to identify an image frame of the photographic document read by the first image reading means;

a second read image frame identifying means for obtaining image frame identification information to identify an image frame of the photographic document read by the second image reading means;

a printing condition determining means for obtaining a printing condition from the printing condition instruction information concerning an instruction as to the printing condition inputted by the instruction input means;

a printing condition information memory means for memorizing the printing condition obtained by the printing condition determining means together with the image frame identification information;

a first printed image frame identification means for obtaining image frame identification information of the photographic document to be printed by the first printing means; and a second printed image frame identification means for obtaining image frame identification information of the photographic document to be printed by the second printing means; wherein the image memory memorizes the electric image from the image reading means for each image frame together with the image frame identification information obtained by the read image frame identifying means; the first printing means selects a printing condition instruction information of an image frame of the photographic document to be printed from the printing condition instruction information memorized in the printing condition instruction information memorizing means by the image frame identification information obtained by the first printed image frame identifying means and conducts the printing on the basis of the selected printing condition instruction information, and the second printing means selects a printing condition instruction information of an image frame of the photographic document to be printed from the printing condition instruction information memorized in the printing condition instruction information memorizing means by the image frame identification information obtained by the second printed image frame identifying means and conducts the printing on the basis of the selected printing condition instruction information.

With the print production system in item 38, since the printing condition information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

Incidentally, when obtaining a printing condition, it is preferable that to seek the printing condition by using information of an electric image allocated to the other image display means makes common data base so that an amount of information can be increased.

39. The print production system described in one of items 21 to 38 is characterized in that the photographic document is a developed photographic film, and the print production system further comprises a first photographic film developing processing means for conducting a development process for a photographic film and supplying the developed photographic film to the first image reading means, and a second photographic film developing processing means for conducting a development process for a photographic film and supplying the developed photographic film to the second image reading means.

With the print production system in item 39, since it is not necessary to set a developed photographic film to the image reading means and each image reading means is arranged so as to corresponds to each photographic film developing processing means, it is not necessary to correct the obtained electric image or to change a printing condition.

Structure to Attain the Second Objective

40. A print production system comprises
a first image reading means for obtaining an electric image by reading a photographic document;
a second image reading means for obtaining an electric image by reading a photographic document;
an image display means capable of both displaying a reproduced image of the photographic document read imagewise by the first image reading means on the basis of the electric image obtained by the first image reading means and displaying a reproduced image of the photographic document read imagewise by the second image reading means on the basis of the electric image obtained by the second image reading means;
an instruction input means capable of both inputting an instruction concerning a printing condition for the photographic document which is read by the first image reading means and is displayed by the image display means and inputting an instruction concerning a printing condition for the photographic document which is read by the second image reading means and is displayed by the image display means;
a first printing means for printing the photographic document read imagewise by the first image reading means onto a printing photosensitive material on the basis of the instruction concerning the printing condition inputted by the instruction input means for the photographic document read by the first image reading means; and
a second printing means for printing the photographic document read imagewise by the second image reading means onto a printing photosensitive material on the basis of the instruction concerning the printing condition inputted by the instruction input means for the photographic document read by the second image reading means.

With the print production system in item 40, since a single operator can conduct to determine printing conditions for image frames printed by the plurality of printing means, it is possible to reduce labor cost. Further, the judgment for printing conditions of image frames printed by the plural printing means can be homogenized.

41. The print production system described in item 40 is characterized in comprising an image memory means capable of memorizing electric images from the first image reading means and the second image reading means, wherein the image display means displays the reproduced image of the photographic document on the basis of the electric images memorized in the image memory means.

With the print production system in item 41, since the read images can be memorized as the electric images, a spare time can be obtained between the image reading and the displaying of the reproduced image.

Therefore, even if a judging period of times for each frame or each order fluctuates, since it is not necessary to conduct a next image reading after the judgment has been made, the image reading can be conducted smoothly continuously. Further, since the read image can be memorized as the electric image and the judgement is conducted for the photographic documents read imagewise by the plural image reading means, the occurrence rate of an event that the image reading is stopped for waiting the judgment can be appreciably reduced.

42. The print production system described in item 40 or 41 is characterized in further comprising a printing condition instruction information memory means for memorizing printing condition instruction information as to instruction cocerning the printing condition inputted by the instruction input means, wherein the printing means conducts printing on the basis of the printing condition instruction information memorized in the printing condition instruction information memory.

With the print production system in item 2, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced.

43. The print production system described in item 40 or 42 is characterized in further comprising printing condition determining means for obtaining a printing condition on the basis of the instruction concerning the printing condition inputted by the instruction input means; and printing condition instruction information memory means for memorizing the printing condition information determined by the printing condition determining means, wherein the printing means conducts printing on the basis of the printing condition instruction information memorized in the printing condition instruction information memory.

With the print production system in item 43, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced.

Incidentally, in the case of obtaining a printing condition for a photographic document printed by the first printing means or in the case of obtaining a printing condition for a photographic document printed by the second printing means, it is preferable that to use both information of a photographic document read by the first reading means and information of a photographic document read by the second reading means for obtaining a printing condition makes common data base so that an amount of information can be increased.

44. The print production system described in one of items 40 to 43 is characterized in that when an instruction input means has completed to input an instruction concerning the printing condition for the photographic document belonging to the same order, the instruction input means receives to conduct to input an instruction concerning a printing condition for a photographic document belonging to a different order.

With the print production system in item 44, since an instruction concerning a printing condition for the photographic document is inputted for each order as a unit, information administration per each order as a unit can be conducted easily.

45. The print production system described in item 41 is characterized in that the image memory means can memorize electric images of plural oders and the image display means displays the reproduced image of the photographic document on the basis of the electric images of one order selected from the electric images of the plural oders memorized in the image memory means.

With the print production system in item 45, since an instruction concerning a printing condition for the photographic document is inputted for each order as a unit, information administration per each order as a unit can be conducted easily.

46. The print production system described in item 45 is characterized in further comprising a first image reading order identifying means for obtaining order identification information to identify an order of the photographic document read by the first image reading means; and a second image reading order identifying means for obtaining order identification information to identify an order of the photographic document read by the second image reading means; wherein the image memory means memorizes the electric image from the first image reading means together with the order identification information obtained by the first image reading order identifying means for each order and memorizes the electric image from the second image reading means together with the order identification information obtained by the second image reading order identifying means for each order.

With the print production system in item 46, the electric image obtained by the first image reading means and the electric image obtained by the second image reading means can be administrated for each oder as a unit.

47. The print production system described in item 46 is characterized in further comprising a printing condition instruction information memory means for memorizing printing condition instruction information of plural orders concerning an instruction concerning a printing condition inputted by the instruction input means together with the order identification information;

a first printing order identifying means for obtaining order identification information of the photographic document to be printed by the first printing means; and a second printing order identifying means for obtaining order identification information of the photographic document to be printed by the second printing means; wherein the first printing means selects the printing condition instruction information of the belonging oder of the photographic document to be printed by the first printing means from the printing condition instruction information of the plural orders memorized in the printing condition instruction information memory means by the printing order identification information obtained by the first printing order identifying means and conducts the printing on the basis of the selected printing condition instruction information, and the second printing means selects the printing condition instruction information of the belonging oder of the photographic document to be printed by the second printing means from the printing condition instruction information of the plural orders memorized in the printing condition instruction information memory means by the printing order identification information obtained by the second printing order identifying means and conducts the printing on the basis of the selected printing condition instruction information.

With the print production system in item 47, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

48. The print production system described in item 46 is characterized in further comprising a printing condition determining means for obtaining a printing condition from printing condition instruction information concerning the instruction concerning the printing condition inputted by the instruction input means;

a printing condition instruction information memory means for memorizing printing condition instruction information of plural orders concerning the printing condition determined by the printing condition determining means together with the order identification information;

a first printing order identifying means for obtaining order identification information of the photographic document to be printed by the first printing means; and a second printing order identifying means for obtaining order identification information of the photographic document to be printed by the second printing means; wherein the first printing means selects the printing condition information of the order of the photographic document to be printed by the first printing means from the printing condition information of the plural orders memorized in the printing condition information memory means by the printing order identification information obtained by the first printing order identifying means and conducts the printing on the basis of the selected printing condition instruction information, and the second printing means selects the printing condition information of the order of the photographic document to be printed by the second printing means from the printing condition information of the plural orders memorized in the printing condition information memory means by the printing order identification information obtained by the second printing order identifying means and conducts the printing on the basis of the selected printing condition instruction information.

With the print production system in item 48, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

Incidentally, in the case of obtaining a printing condition for a photographic document printed by the first printing means or in the case of obtaining a printing condition for a photographic document printed by the second printing means, it is preferable that to use both information of a photographic document read by the first reading means and information of a photographic document read by the second reading means for obtaining a printing condition makes common data base so that an amount of information can be increased.

49. The print production system described in one of items 4 to 16 is characterized in further comprising a first read image frame identifying means for obtaining image frame identification information to identify an image frame of the photographic document read by the first image reading means;

a second read image frame identifying means for obtaining image frame identification information to identify an image frame of the photographic document read by the second image reading means;

an image memory means for memorizing the electric images from the first image reading means together with the image frame identification information obtained by the first read image frame identifying means for each image frame and for memorizing the electric images from the second image reading means together with the image frame identification information obtained by the second read image frame identifying means for each image frame;

a printing condition instruction information memory means for memorizing printing condition instruction information concerning an instruction as to the printing condition inputted by the instruction input means together with the image frame identification information;

a first printed image frame identification means for obtaining image frame identification information of the photographic document to be printed by the first printing means; and a second printed image frame identification means for obtaining image frame identification information of the photographic document to be printed by the second printing means; wherein the first printing means selects printing condition instruction information of an image frame of the photographic document to be printed from the printing condition instruction information memorized in the printing condition instruction information memorizing means by the image frame identification information obtained by the first printed image frame identifying means and conducts the printing on the basis of the selected printing condition instruction information, and the second printing means selects printing condition instruction information of an image frame of the photographic document to be printed from the printing condition instruction information memorized in the printing condition instruction information memorizing means by the image frame identification information obtained by the second printed image frame identifying means and conducts the printing on the basis of the selected printing condition instruction information.

With the print production system in item 49, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

50. The print production system described in one of items 40 to 48 is characterized in further comprising a first read image frame identifying means for obtaining image frame identification information to identify an image frame of the photographic document read by the first image reading means;

a second read image frame identifying means for obtaining image frame identification information to identify an image frame of the photographic document read by the second image reading means;

an image memory means for memorizing the electric images from the first image reading means together with the image frame identification information obtained by the first read image frame identifying means for each image frame and for memorizing the electric images from the second image reading means together with the image frame identification information obtained by the second read image frame identifying means for each image frame;

a printing condition determining means for obtaining a printing condition from the printing condition instruction information concerning an instruction as to the printing condition inputted by the instruction input means;

a printing condition information memory means for memorizing the printing condition obtained by the printing condition determining means together with the image frame identification information;

a first printed image frame identification means for obtaining image frame identification information of the photographic document to be printed by the first printing means; and a second printed image frame identification means for obtaining image frame identification information of the photographic document to be printed by the second printing means; wherein the first printing means selects a printing condition instruction information of an image frame of the photographic document to be printed from the printing condition instruction information memorized in the printing condition instruction information memorizing means by the image frame identification information obtained by the first printed image frame identifying means and conducts the printing on the basis of the selected printing condition instruction information, and the second printing means selects a printing condition instruction information of an image frame of the photographic document to be printed from the printing condition instruction information memorized in the printing condition instruction information memorizing means by the image frame identification information obtained by the second printed image frame identifying means and conducts the printing on the basis of the selected printing condition instruction information.

With the print production system in item 50, since the printing condition information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information.

Incidentally, in the case of obtaining a printing condition for a photographic document printed by the first printing means or in the case of obtaining a printing condition for a photographic document printed by the second printing means, it is preferable that to use both information of a photographic document read by the first reading means and information of a photographic document read by the second reading means for obtaining a printing condition makes common data base so that an amount of information can be increased.

51. In a print production system including a plurality of print production systems each which comrises an image reading means for reading photographic documents and obtaining electric images;

an image display means for displaying the reproduced images of the photographic documents on the basis of the electric imaes obtained by plural image reading means;

an instruction input means for inputting an instruction concerning a printing condition for a photographic document displayed by the image displaying means;

a printing means for printing the photographic document read imagewise by the image reading means onto a printing photosensitive material on the basis of the instruction concerning the printing condition inputted by the instruction input means, the print system is characterized in that each image display means of the plurality of print production systems is arranged to be observable from one position, and each instruction input means is arranged so as to be possibe to be inputted by an operator observing from the one position.

With the print production system in item 51, since printing condition of image frames to be printed by the plural printing means can be judged by a single operator, labor cost can be reduced accordingly. Further, the judgment for printing conditions of image frames printed by the plural printing means can be homogenized.

Incidentally, as an embodiment that each image display means of each print production system is arranged to be observable from one position, in addition to the embodiment described in item 52, there may be an emobodiment that each image display means is a separate body from each print production system and is arranged to adjoin to others so that each image display means is observable from one position, or an emobodiment that each image display means is a separate body so as to be away from each print production system and a screen of each display means is directed to face one position is arranged to adjoin to others so that each image display means is observable from the one position.

Incidentally, as an embodiment that each instruction input means is arranged so as to be possibe to be inputted by an operator observing from the one position, in addition to the embodiment described in item 53, there may be an embodiment that each instruction input means is a separate body from each print production system and is arranged to adjoin to others so that a single operator observing from the one position can input or an emobodiment that the a main body of the instruction input means is a separate body from the print production system and an operator observing from the one postion inputs by a remotecontrol input device common to the plural instruction input means so that the operator can input the main body of each instruction input means.

52. The print production system described in item 51 is characterized in that a single set of an image display means is used in common to each image display means of plural print production systems.

With the print production system in item 52, while observing the same image display means, it is possible for a single operator to conduct the judgment as to printing conditions for image frames printed by plural printing means, and also it is possible to conduct the judgment more efficiently. Further, the judgment for printing conditions of image frames printed by the plural printing means can be homogenized.

53. The print production system described in item 52 is characterized in that a single set of an instruction input means is used in common to each instruction input means of plural print production systems.

With the print production system in item 52, by inputting with the same instruction input means, it is possible for a single operator to conduct the judgment as to printing conditions for image frames printed by plural printing means, and also it is possible to conduct the judgment more efficiently.

54. In a printing condition instructing apparatus which obtains an electric image by a first image reading means for obtaining the electric image by reading a photographic image;

obtains an electric image by a second image reading means for obtaining the electric image by reading a photographic image;

outputs an instruction concerning a printing condition for the photographic document read by the first image reading means for the first printing means for printing the photographic document read by the first image reading means onto a printing photosensitive material; and outputs an instruction concerning a printing condition for the photographic document read by the second image reading means for the second printing means for printing the photographic document read by the second image reading means onto a printing photosensitive material;

the printing condition instruction apparatus is characterized in comprising an image display means capable of both displaying the reproduced image of the photographic document read by the first image reading means on the basis of the electric image obtained by the first image readig means and displaying the reproduced image of the photographic document read by the second image reading means on the basis of the electric image obtained by the second image readig means; and an instruction input means capable of both inputting an instruction concerning the printing condition for the photographic document which is read by the first image reading means and is displayed on the image display means and inputting an instruction concerning the printing condition for the photographic document which is read by the second image reading means and is displayed on the image display means, wherein the printing condition instruction apparatus outputs to the first printing apparatus the instruction which is inputted by the instruction input means and is concerned with the printing condition for the photographic document read by the first image reading means and outputs to the second printing apparatus the instruction which is inputted by the instruction input means and is concerned with the printing condition for the photographic document read by the second image reading means.

With the print production system in item 54, since the printing condition instruction information can be memorized, spare time can be obtained between the input for the instruction as to a printing condition and the printing.

Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced. Further, the printing condition instruction information can be administrated based on the order identification information. 55. In a printing condition instructing apparatus which obtains an electric image by a first image reading means for obtaining the electric image by reading a photographic image;

obtains an electric image by a second image reading means for obtaining the electric image by reading a photographic image;

outputs printing condition information concerning a printing condition for the photographic document read by the first image reading means for the first printing means for printing the photographic document read by the first image reading means onto a printing photosensitive material; and outputs printing condition information concerning a printing condition for the photographic document read by the second image reading means for the second printing means for printing the photographic document read by the second image reading means onto a printing photosensitive material;

the printing condition instruction apparatus is characterized in comprising an image display means capable of both displaying the reproduced image of the photographic document read by the first image reading means on the basis of the electric image obtained by the first image readig means and displaying the reproduced image of the photographic document read by the second image reading means on the basis of the electric image obtained by the second image readig means;

an instruction input means capable of both inputting an instruction concerning the printing condition for the photographic document which is read by the first image reading means and is displayed on the image display means and inputting an instruction concerning the printing condition for the photographic document which is read by the second image reading means and is displayed on the image display means; and a printing condition determining means for obtaining a printing condition on the basis of the instruction concerning the printing condition inputted by the instruction input means;

wherein the printing condition instruction apparatus outputs to the first printing apparatus the printing condition information which is obtained by the printing condition determining means and is concerned with the printing condition for the photographic document read by the first image reading means and outputs to the second printing apparatus the printing condition information which is obtained by the printing condition determining means and is concerned with the printing condition for the photographic document read by the second image reading means.

With the print production system in item 54, since the printing condition instruction information can be memorized, spare time can be obtained between the input for the instruction as to a printing condition and the printing. Therefore, even if a judging period of times for each frame or each order fluctuates, since the printing can be conducted based on the previously judged results, an occurrence rate of an event that printing is stopped for waiting the judgment can be reduced. Further, since the judgment for a photographic document to be printed by a plurality of printing means is conducted, the occurrence rate of an event that printing is stopped for waiting the judgment can be further reduced.

Incidentally, in the case of obtaining a printing condition for a photographic document printed by the first printing means or in the case of obtaining a printing condition for a photographic document printed by the second printing means, it is preferable that to use both information of a photographic document read by the first reading means and information of a photographic document read by the second reading means for obtaining a printing condition makes common data base so that an amount of information can be increased.

DETAILED DESCRIPTION OF THE PREFERRED EMBODIMENT

Various concrete examples according to the present invention will be described in the embodiments set forth below, however, the present invention is not limited to these. Although terms are conclusively expressed, these are merely preferable examples, and do not limit the meaning of terms nor the scope of technology of the present invention.

Firstly, Examples 1 to 5 to attain the first objective will be explained.

EXAMPLE 1

Figure 1:
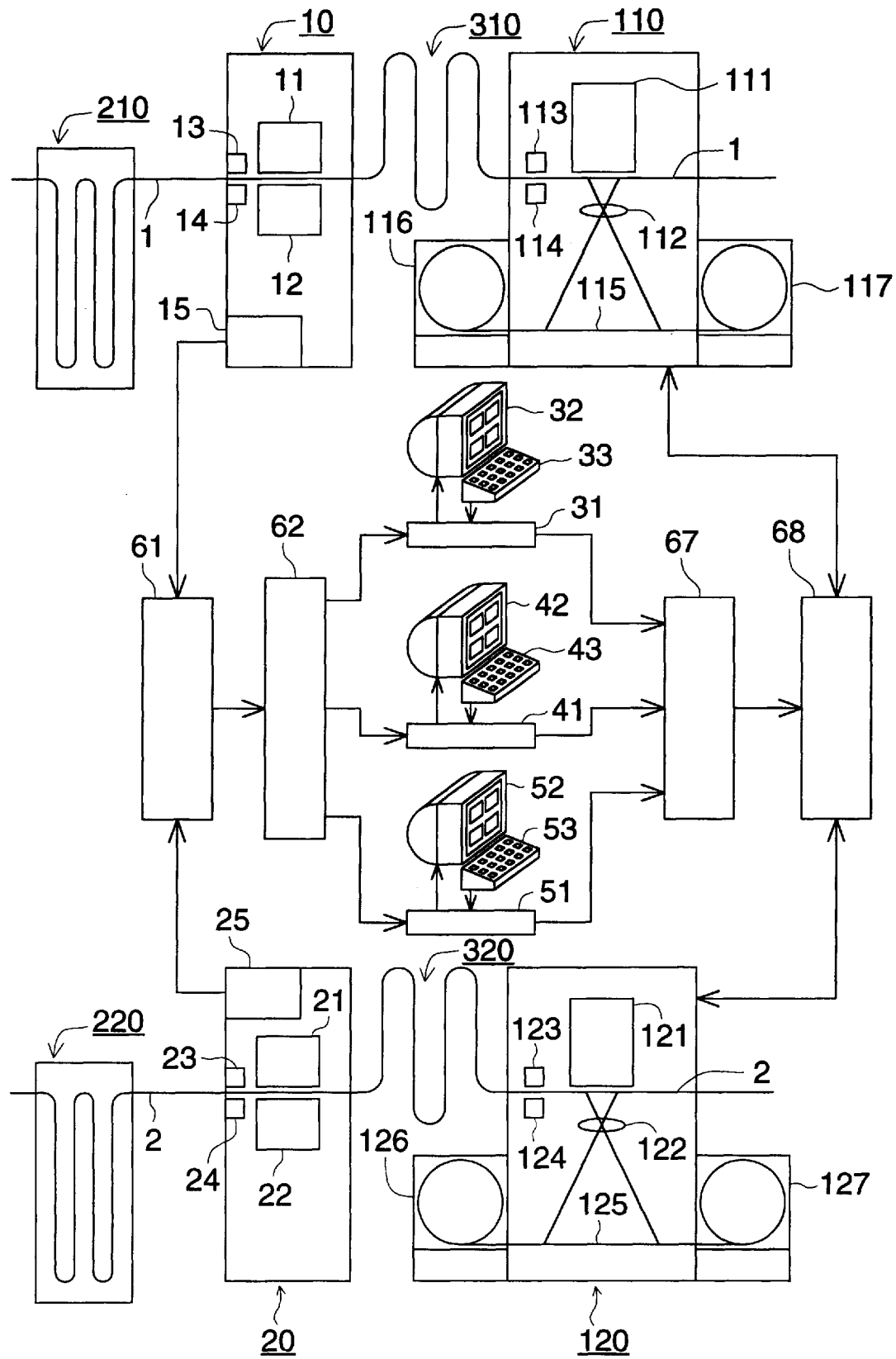
FIG. 1 is a view showing the general structure of a print production system of Example 1.

FIG. 1 is a view showing the general structure of a print production system of the present example. Referring to FIG. 1, the print production system of the present example will be described below. The print production system of the present example is a photograph production system having, generally, a first development processing apparatus 210 to development-process an un-developed photographic photosensitive material; a first image reading apparatus 10 to obtain a digital image by imagewise reading a photographic document 1, in which the photographic photosensitive material, development-processed by the first development processing apparatus, is used as the photographic document; a second development-processing apparatus 220 to development-process an un-developed photogrqaphic material; the second image reading apparatus 20 to obtain a digital image by imagewise reading a photographic document 2 by using a photographic photosensitive material, development-processed by the second development processing apparatus, as the photographic document; the first printing apparatus 110 to print an image from the photographic document 1, read imagewise by the first image forming apparatus 10, onto a printing photographic material 115; and the second printing apparatus 120 to print an image from the photographic document 2, read imagewise by the second image forming apparatus 10, onto a printing photographic material 125. In the print production system of the present invention, in the case of handling a plurality of the photographic documents such as a photographic film, the plurality of photographic documents may be spliced with a tape. However, it may be also possible to convey each photographic document independently of others without being spliced.

The printing conditions of the first printing apparatus 110 and the second printing apparatus 120 are determined when the reproduced image of the photographic document, read imagewise according to the digital image obtained by the first image reading apparatus 10 or the second image reading apparatus 20, is displayed, and instruction for the printing condition with respect to the displayed photographic document, is inputted. This will now be described.

An image storage section 161 is provied in which the digital image obtained by imagewise reading by the first image reading apparatus 10 and the digital image obtained by imagewise reading by the second image reading apparatus 20, are stored. This image storage section 61 stores the digital images from the first image reading apparatus 10 and the second image reading apparatus 20. An allocation section 62 allocates the digital images, stored in the image storage section, to image control sections 31, 41 and 51 by each order. The image control sections 31, 41 and 51 display the reproduced images of the photographic documents, read imagewise by the first image reading apparatus 10 or the second image reading apparatus 20, on image display sections 32, 42 and 52, according to the allocated digital images. Then, exposure correction amounts (an example of the instructions for the printing condition) with respect to the photographic document, which has been read imagewise by the first image reading apparatus 10 or the second image reading apparatus 20, and whose reproduced images have been displayed on the image display sections 32, 42 and 52, are inputted into the apparatus by instruction input keyboards 33, 43 and 53. The exposure correction amounts with respect to the photographic document, read imagewise by the first image reading apparatus 10 or the second image reading apparatus 20, are sent to a printing condition determination section 67, wherein the exposure correction amounts have been inputted by the instruction input keyboard 33, 43 and 53. The printing condition determination section 67 determines an exposure control amount from the exposure correction amounts, sent as above, and sends the determined exposure control amount to a printing condition storage section 68. The printing condition storage section 68 stores the sent exposure control amount, and appropriately sends the stored exposure control amount to printing apparatus 110 and 120.

In the present example, bar-code seals, on which order information to identify the order, is recorded, are stuck onto the leading photographic documents 1 and 2 of each each order. The bar-code seals stuck onto the leading photographic document 1 and 2 of each order are read in the first discrimination section 14, the second discrimination section 24, the first printing discrimination section 114 or the second printing discrimination section 124, and the order information of each photographic document is thus obtained. Further, normally, a frame number code is provided on the side portions of the photographic documents 1 and 2, and image frame discrimination information is obtained by reading the frame number code.

Next, the first image reading apparatus 10 will be described. The first image reading apparatus 10 imagewise reads the photographic document 1 to obtain an electornic image. The first image forming section 12 imagewise reads the photographic document 1, illuminated by an image forming light source 11, and an analog electronic image is obtained and digitized. Characteritics of the image forming light source 11 and the first image forming section 12 are corrected and then a digital image is obtained. Then, a digital image, which is an image formed image of the image frame, is sent from this image forming section 22 to a transmiting/receiving section 25. The first image forming appratus 10 is provided with a first discriminating section 14, by which order discrimination information to discriminate the order of the photographic document 1, read imagewise by the first image reading apparatus 10, is obtained for each order, and simultaneously, image frame discrimination information to discriminate the image frame is obtained for each image frame. The first discrimination section light source 13 is provided as the light source of the first discrimination section 14. The order discrimination information is sent for each order, and the image frame discrimination information is sent for each image frame, from the first discrimination section 14 to the transmitting/receiving section 15. Then, the order discrimination information is transmitted for each order from the transmitting/receiving section 15 to the image storage section 61, and the image frame discrimination information and the digital image which is an read imagewise image of the image frame, are transmitted for each frame.

The second image reading apparatus 20 functions the same as above. The second image reading apparatus 20 imagewise reads the photographic document 2 to obtain an electornic image. The second image forming section 22 imagewise reads the photographic document 2, illuminated by an image forming light source 21, and an analog electronic image is obtained and then, digitized. Characteritics of the image forming light source 21 and the second image forming section 22 are corrected and a digital image is then obtained. A digital image, which is an image formed image of the image frame, is sent from this image forming section 22 to a transmiting/receiving section 25. The second image forming appratus 20 is provided with a second discriminating section 24, by which order discrimination information to discriminate the order of the photographic document 2, read imagewise by the second image reading apparatus 20, is obtained for each order, and simultaneously, image frame discrimination information to discriminate the image frame is obtained for each image frame. The second discrimination section light source 23 is provided as the light source of the second discrimination section 24. The order discrimination information for each order, and the image frame discrimination information for each image frame, is sent from the second discrimination section 24 to the transmitting/receiving section 25. Then, the order discrimination information is transmitted for each order from the transmitting/receiving section 25 to the image storage section 61, and the image frame discrimination information and the digital image, which is an read imagewise image of the image frame, are transmitted for each frame.

An image storage section 61 stores the digital image, for each image frame, obtained from the first image forming apapratus 10, together with the image frame discrimination information obtained from the first discrimination section 14, along with the order discrimination information for each order, obtained from the first discrimination section 14. Further, the digital image from the second image reading apparatus 20 is also stored for each image frame in the image storage section 61, together with the image frame discrimination information, obtained by the second discrimination section 24, along with the order discrimination information obtained from the second discriminaiton section 24 for each order.

When the allocation section 62 receives image transfer instruction signals from the control sections 31, 41 and 51, the allocation section 62 transfers the digital image stored in the image storage section 61, for each order, to the image control sections 31, 41 and 51, which have transmitted the image transfer instruction signals. In this case, the allocation section 62 transfers the digital image together with image frame discrimination information for each image frame of the digital image, stored in the image storage section 61. Further, it transfers the digital image together with the order discrimination information for each order. In this connection, when a plural order of the digital image have not yet been transferred to the image storage section 61, the digital images stored in the image storage section 61, are transferred in the order of image formation.

The image control section 31, 41 and 51 determine a, standard printing exposure amount for each image frame from one order of transferred digital image information. Then, negative/positive-conversion is carried out for each image frame based on the standard printing exposure amount, and characteristics of the image display sections 32, 42 and 52, corresponding to the image control sections 31, 41 and 51, are corrected. The image control sections 31, 41 and 51 make images to display a plurality of image frames in one order; this image is converted into analog, and display image signals are transferred to the image display sections 32, 42 and 52, corresponding to the image control sections 31, 41 and 51. The reproduced image of a print of the printing photosensitive material, printed from the read imagewise photogrqaphic document, is displayed on the corresponding image display section 32, 42 and 52. The image display sections 32, 42 and 52 display the reproduced images of plural image frames belonging to one order, by display image signals. Thus, the image display sections 32, 42 and 52 display the reproduced images of the plural image frames of the photographic document belonging to one order, according to the digital images of one order which is selected by the allocation section 62.

The printing correction amounts for the reproduced images of the plural image frames of the photographic documents belonging to the one order, displayed by the image display sections 32, 42 and 52, are received by the instruction input keyboards 33, 43 and 53 corresponding to the image display sections 32, 42 and 52. The printing correction amounts (the instruction concerning the printing conditions) which are inputted by the instruction input keybords 33, 43 and 53, are respectively sent to the image control sections 31, 41 and 51 corresponding to the instruction input keyboards 33, 43 and 53. Then, the image control sections 31, 41 and 51 carry out negative/positive-conversion for the image frames, according to this printing correction amount and the standard printing exposure amount, from the transferred digital image information of one order, so that characteristics of the image display sections 32, 42 and 52 respectively corresponding to the image control sections 31, 41 and 51, are corrected.

Following that, the image, displaying a plurality of image frames in one order, including the corresponding image frame, is formed again, converted to analog, and the display image signals are respectively transferred to the image display sections 32, 42 and 52, corresponding to the image control sections 32, 41 and 51. The image display sections 32, 42 and 52 display the reproduced images of the plurality of image frames in one order, by the display image signal. In this case, the printing correction amount is also displayed. Thus, the reproduced image of the image frame can be displayed, including the effects of the inputted printing correction amount.

Then, when the completion of the input of the printing condition instruction with respect to the image frame, displayed on the image display sections 32, 42 and 52, is inputted from the instruction input keyboards 33, 43 and 53, the standard printing exposure amount, obtained by the image control sections 31, 41 and 51 corresponding to the keyboards 33, 43 and 53, and the latest printing correction amount, inputted by the instruction input keyboards 33, 43 and 53, are stored, and simultaneously, the reproduced images of other plural image frames, belonging to the same order, are displayed. Then, when the completion of the input of the printing condition instruction with respect to the image frame, displayed on the image display sections 32, 42 and 52, is inputted from the instruction input keyboards 33, 43 and 53, and when the input of the printing condition instruction with respect to all image frames belonging to the same order, has been completed, then the standard printing exposure amount obtained in the image control sections 31, 41 and 51, and the printing correction amount which has been stored and lately inputted, are sent to a printing condition determination section 67, together with the order discrimination information for the corresponding order, and the image frame discrimination information for each image frame.

Thus, after the instruction for the printing condition of the photogrqaphic document belonging to the same order has been inputted by the instruction input keyboards 33, 43 and 53, the instruction for the printing condition of the photogrqaphic document belonging to another order can be inputted from the keybords 33, 43 and 53. Due to this, the instruction for the printing condition of the photogrqaphic document for each order is inputted, and the control after this input, can be carried out for each order, resulting in easy information control.

The printing condition determination section 67 determines the printing exposure amount (printing condition) from the sent standard printing exposure amount and printing correction amount. Then, the order discrimination information of the corresponding order, for each order, and the image frame discrimination information and the obtained printing exposure amount (printing condition information) for each image frame, are sent to a printing condition storage section 68.

The printing condition storage section 68 stores the printing exposure amount (printing condition information) determined by the printing condition determination section 67. The first printing apparatus 110 and the second printing apparatus 120 conduct printing according to the printing condition information, stored in the printing condition storage section 68. Due to this, the printing condition can be stored, and thereby, a sufficent time is produced between the input of instruction for the printing condition and the actual printing. Accordingly, even if the discrimination time for each frame or each order fluctuates, the printing can be conducted according to the previously discriminated result. Thereby, the rate of waiting time for the discrimination for printing, can be redued. Further, discrimination is conducted for the photographic document printed by a plurality of printing apparatus, and thereby, the rate of waiting time for the discrimination for printing, can be still further reduced.

Next, the first printing apparatus 110 will be described. The first printing apparatus 110 prints a photographic document 1, illuminated by a printing light source 111, onto a printing phtosensitive material 115 by image-forming by a lens section 112. The first printing apparatus 110 is provied with the first printing discrimination section 114 by which the orer discrimination information to discriminate the order of the photograpic document 1 to be printed by the first printing apparatus 110 is obtained for each oredr, and simultaneously the image frame discrimination information to discriminate the image frame is obtained for each image frame. The first printing discrimination section light source 113 is provied as the light source of the first printing discrimination section 114. The order discrimination information for each order and the image frame discrimination information for each image frame are transferred from the first printing discrimination section 114 to the printing condition storage section 68.

The printing condition storage section 68 transfers the printing exposure amount (printing condition information) corresponding to the order and the image frame, to the first printing apparatus 110, according to the order discrimination information transferred for each order, and the image frame discrimination information transferred for each image frame.

The first printing apparatus 110 controls the printing light source 111 and the lens section 112 so that the printing exposure amount is equal to the transmitted one, and prints the photographic document 1 onto the printing photosensitive material 115. In this connection, the printing photosensitive material 115 is supplied from a magazine 116 in which unexposed printing photosensitive material is accommodated, and is wound into a magazine 117 in which exposed printing photosensitive material is accommodated. An accumulation mechanism 310, (a looping mechanism), is provided between the first image reading apparatus 10 and the seecond printing apparatus 110 so as to cope with fluctuations of exposure time and fluctuations of discrimination time.

Further, the second printing apparatus 120 is structured in the same manner as for the apparatus 110 above. The second printing apparatus 120 prints a photographic document 2, illuminated by a printing light source 121, onto a printing phtosensitive material 125 by image-forming by a lens section 122. The second printing apparatus 120 is provided with the second printing discrimination section 124 by which the order discrimination information to discriminate the oreder of the photograpic document 2 to be printed by the second printing apparatus 120 is obtained for each order, and simultaneously the image frame discrimination information to discriminate the image frame is obtained for each image frame. The second printing discrimination section light source 123 is provided as the light source of the second printing discrimination section 124. The order discrimination information for each order and the image frame discrimination information for each image frame are transfeered from the second printing discrimination section 114 to the printing condition storage section 68.

The printing condition storage section 68 transfers the printing exposure amount (printing condition information) corresponding to the order and the image frame, to the second printing apparatus 120, according to the order discrimination information transferred for each order, and the image frame discrimination information transferred for each image frame.

Then, the second printing apparatus 120 controls the printing light source 121 and the lens section 122 so that the printing exposure amount is equal to the transmitted amount, and prints the photographic document 2 onto the printing photosensitive material 125. In this connection, the printing photosensitive material 125 is supplied from a magazine 126 in which un-exposed printing photosensitive material is accommodated, and is wound into a magazine 127 in which exposed printing photosensitive material is accommodated. An accumulation (looping) mechanism 320 is provided between the second image reading apparatus 20 and the second printing apparatus 120 so as to cope with fluctuations of the exposure time or fluctuations of discrimination time.

Due to the above-description, the printing condition storage section 68 can store the printing condition information, and therefore, sufficient time is produced between the input of instruction for the printing condition and the actual printing. Accordingly, even if discrimination time for each frame or each order fluctuates, the printing can be conducted according to the previously discriminated result. Thereby, the rate of waiting time for the discrimination for printing, can be redued. Further, discrimination can be conducted for the photographic document printed by a plurality of printing apparatus, and thereby, the rate of waiting time for the discrimination for printing, can be further reduced, and the printing condition information can be controlled by the order discrimination information.

Incidentally, when the first image reading apparatus 10 and the second image reading apparatus 20 securely transfer the order discrimination information, different from each other, information such as the printing exposure amount, can be securely transferred to the first printing apapratus 110 and also to the second printing apparatus 120, even if the image reading apparatus discrimination information to discriminate which image reading apparatus has conducted image formation, is not stored nor transferred.

Further, when the image reading apparatus discrimination information to discriminate which image reading apparatus has conducted image formation, is stored or transferred, information such as the printing exposure amount, can be securely transferred to both the first printing apapratus 110 and the second printing apparatus 120. Further, in the image control sections 31, 41 and 51, the reproduced image can be formed or the display image can be formed, by both the first image reading apparatus 10 and the second image forming apapratus 20 with conditions differing from each other. Thereby, the reproducibility of displayed images to reproduce prints can be increased, and the obtained exposure control amount can be a more appropriate one, and thereby, higher quality prints can be obtained, even when the first image reading apparatus 10 and the second image reading apparatus 20 are different from each other, the first printing apparatus 110 and the second printing apparatus 120 are different from each other, and when the processing conditions of the printing photosensitive material is different in the first printing apparatus 110 and the second printing apparatus 120. In this connection, the image reading apparatus discrimination information may be the information other than the order discrimination information, or may be information, used also as the order discrimination information.

The printing photosensitive material 115 printed by the first printing apparatus 110 and the printing photosensitive material 125 printed by the second printing apparatus 120, may be developing processed by the same developing apparatus, or by a developing apparatus respectively provided for each printing apparatus. If possible, it is preferable for the control of the printing conditions and developing conditions, that the printing photosensitive material printed by one printing apparatus, be developed by the same developing apparatus.

EXAMPLE 2

Figure 2:
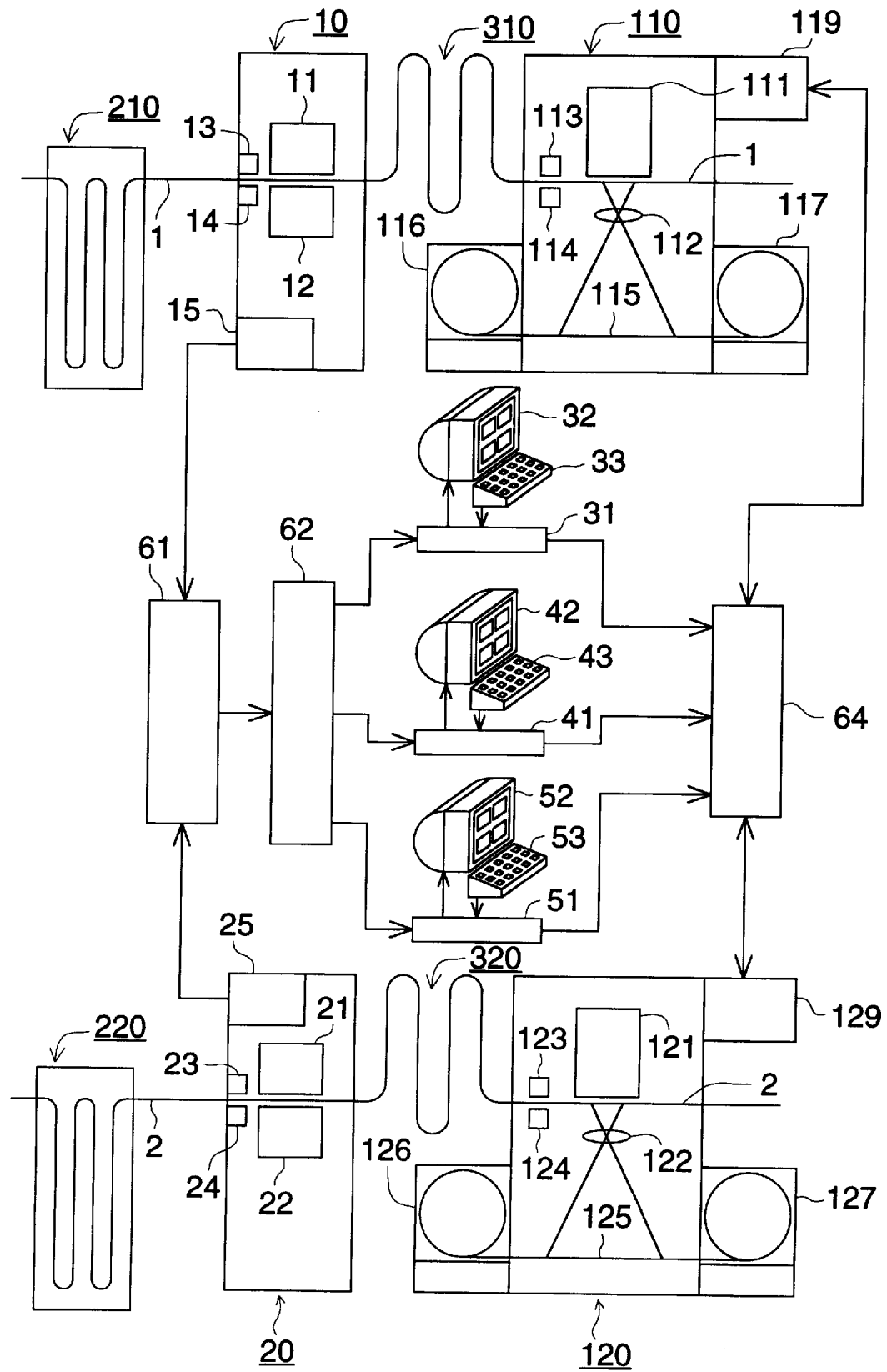
FIG. 2 is a view showing the general structure of a print production system of Example 2.

The present example is a variation of Example 1. The structure of a print production system of the present example is shown in FIG. 2. Referring to FIG. 2, only different points, in the print production system of the present example, from Example 1, will be described below. Points, not described below, are identical to those in Example 1.

Initially, the different points of the first image reading apparatus 10 will be described. The following points are different from Example 1: in the control section 15, the standard printing exposure amount is calculated from a digital image, and the reproduced image is obtained when printing is conducted using the standard printing exposure amounts for the digital image, which is normalized by the standard printing exposure amount, and in which the negative image and the positive image are reversed; and the order discrimination information is transferred for each order from the control section 15 to the image storage section 61, and the image frame discrimination information, the standard printing exposure amounts of the image frame, and its reproduced image, are transferred for each image frame.

The second image reading apparatus 20 is also the same as the above apparatus. The following points are different from Example 1: in the control section 25, the standard printing exposure amount is calculated from a digital image, and the reproduced image is obtained when printing is conducted using the standard printing exposure amounts for the digital image, which is normalized by the standard printing exposure amount, and in which the negative image and the positive image are reversed; and the order discrimination information is transferred for each order from the control section 25 to the image storage section 61, and the image frame discrimination information, the standard printing exposure amount of the image frame, and its reproduced image, are transferred for each image frame.

The image storage section 61 stores the reproduced image from the first image reading apparatus 10, together with the standard exposure amount and the image frame discrimination information obtained from the first discrimination section 14, for each image frame, and the order discriminaiton information obtained from the first discrimination section 14, for each order; and stores the reproduced image from the second image forming apapratus 20, together with the standard exposure amount and the image frame discrimination information obtained from the second discrimination section 24, for each image frame, and the order discriminaiton information obtained from the second discrimination section 24, for each order.

When the allocation section 62 receives the image transfer instruction signals from the image control sections 32, 41 and 51, it transfers the reproduced image for each order, which is stored in the image storage section 61, to the image control sections 31, 41 and 51, which have transmitted the image transfer instruction signals. In this case, the image frame instruction information and the standard exposure amount are transferred together for each image frame of the reproduced image, stored in the image storage section 61. Further, they are transferred together with the order discrimination information. In this connection, when the reproduced images for a plurality of orders are not yet transferred to the image storage section 61, the reproduced images, stored in the image storage section 61, are transferred to the image storage section 61 in the received order.

The image control sections 31, 41 and 51 correct the characteristics of the image display sections 32, 42 and 52 corresponding to the image control sections 31, 41 and 51, based on the transferred reproduced images; form images, displaying a plurality of image frames belonging to one order; analog-converts the image; and transfer the display image signals to the image display sections 32, 42 and 52 corresponding to the image control sections 31, 41 and 51. The image display sections 32, 42 and 52 display the reproduced images of a plurality of image frames belonging to one order according to the display image signals. Thus, the image display sections 32, 42 and 52 display the reproduced images of the plurality of image frames of the photographic document belonging to one order, according to the reproduced images belonging to one order, selected by the image control sections 31, 41 and 51.

The printing correction amounts corresponding to the reproduced images of the plurality of image frames of the photographic document belonging to one order, displayed on the image display sections 32, 42 and 52, are received by the instruction input key boards 33, 43 and 53 corresponding to the image display sections 32, 42 and 52. The printing correction amounts (the instruction for printing conditions), inputted from the instruction input keyboards 33, 43 and 53, are sent to the image control sections 31, 41 and 51 corresponding to the instruction input keyboards 33, 43 and 53. Then, when the completion of the input of the printing correction amounts is inputted from the instruction input keyboards 33, 43 and 53, the printing correction amounts, inputted from the instruction input keyboards 33, 43 and 53, are stored, and the image display sections 32, 42 and 52 corresponding to the instruction input keyboards 33, 43 and 53, display the reproduced images of a plurality of other image frames belonging to the same order. In the case where the input of the printing correction amounts of all image frames belonging to the same order has been completed, when the completion of the input of the printing correction amounts is inputted from the instruction input keyboards 33, 43 and 53, then, the order discrimination information of the corresponding order, the image frame discrimination information of each image frame, the standard exposure control amount, and the latest inputted printing correction amount are sent to the printing condition instruction information storage section 64.

The printing condition instruction information storage section 64 stores the sent exposure correction amount (the printing condition instruction information). The first printing apparatus 110 and also the second printing apparatus 120 print according to the printing condition instruction information stored in the printing condition instruction information storage section 64. Due to this, because the printing condition instruction information can be stored, sufficient time can be produced between the input of the instruction for printing conditions and the printing operation; even if discrimination time for each frame or each order fluctuates, the printing operation can be carried out according to the previous judgement result, and the rate of waiting time for the judge for printing can be reduced; and the judgement is carried out for the photographic document printed by a plurality of printing apparatus, resulting in a decrease of the rate of waiting time for the judgement for printing.

Next, differences of the first printing apparatus will be described. The first printing apparatus 110 includes a first printing condition determination section 119. The order discrimination information for each order, and the image frame discrimination information for each image frame are transferred from a first printing discrimination section 114 to the first printing condition determination section 119. This first printing condition determination section 119 transfers the order discrimination information, transferred for each order, and the image frame discrimination information, transferred for each image frame, to the printing condition instruction information storage section 64. Then, the printing condition instruction information storage section 64 transfers the standard printing exposure amount of the corresponding image frame and the printing correction amount to the first printing condition determination section 119, from the order discrimination information, transferred for each order, and the image frame discrimination information, transferred for each image frame. Then, the first printing condition determination section 119 determines the printing exposure amount (the printing conditions) from the standard printing exposure amount of the corresponding image frame and the printing correction amount.

The second printing apparatus 120 is almost the same as the first printing apparatus. The second printing apparatus 120 includes a second printing condition determination section 129. The order discrimination information for each order, and the image frame discrimination information for each image frame are transferred from a second printing discrimination section 124 to the second printing condition determination section 129. This second printing condition determination section 129 transfers the order discrimination information, transferred for each order, and the image frame discrimination information, transferred for each image frame, to the printing condition instruction information storage section 64. Then, the printing condition instruction information storage section 64 transfers the standard printing exposure amount of the corresponding image frame and the printing correction amount to the second printing condition determination section 129, from the order discrimination information, transferred for each order, and the image frame discrimination information, transferred for each image frame. Then, the second printing condition determination section 129 determines the printing exposure amount (the printing conditions) from the standard printing exposure amount of the corresponding image frame and the printing correction amount.

EXAMPLE 3

Figure 3:
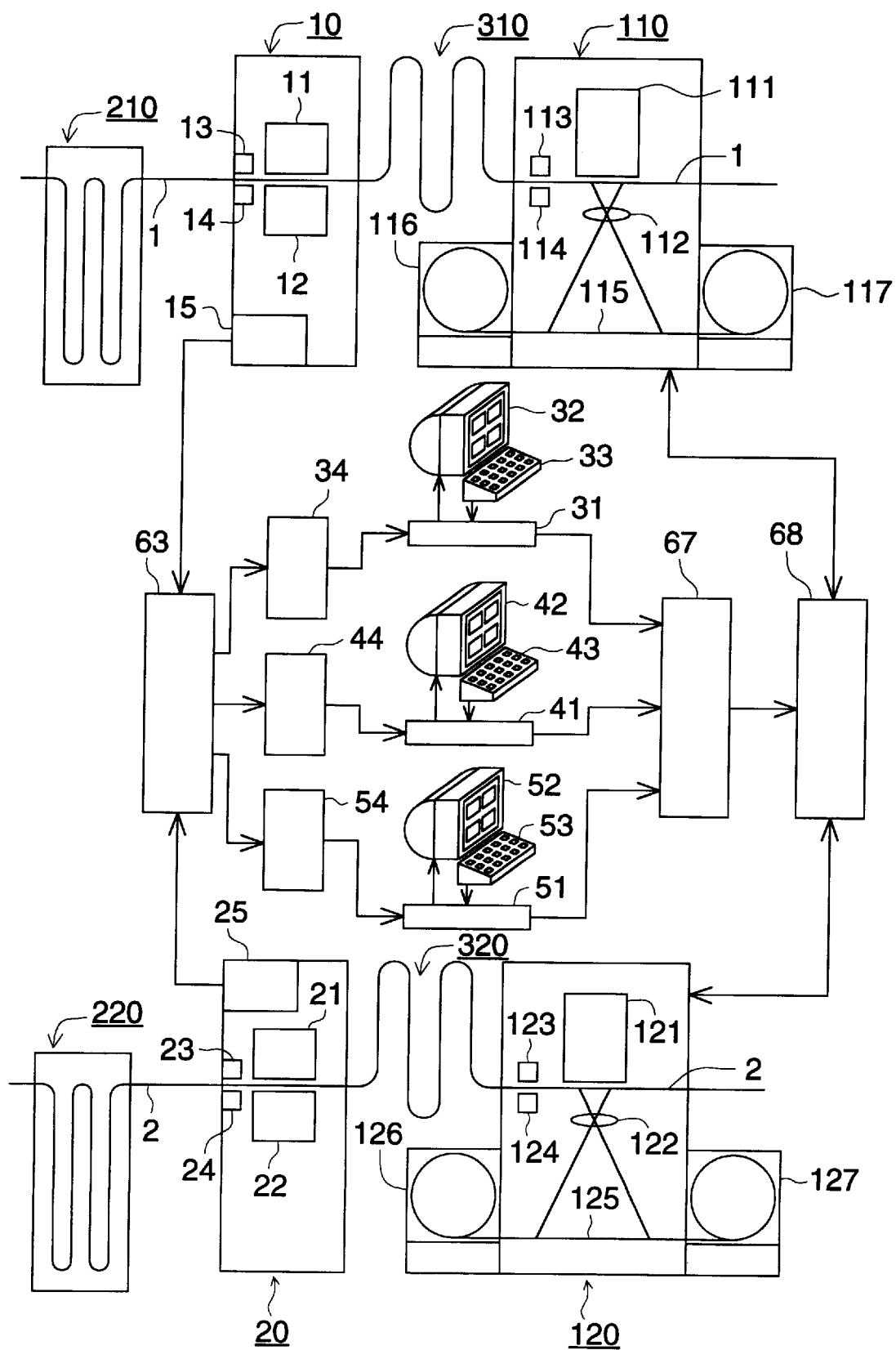
FIG. 3 is a view showing the general structure of a print production system of Example 3.

The present example is a variation of Example 1. The general structure of a print production system of the present example is shown in FIG. 3. Referring to FIG. 3, only differences from Example 1, in the print production system of the present example, will be described below. Points, not described below, are entirely the same as those in Example 1.

Image storage sections 34, 44 and 45, which store the digital images, are respectively provided for image control sections 31, 41 and 51. An allocation section 63 is provided before these image storage sections 34, 44 and 45. The digital image obtained by imagewise reading by the first image reading apparatus 10, and that by the second image reading apparatus 20 are transferred to the allocation section 63 for each order. The digital image obtained by imagewise reading by the first image reading apparatus 10, and that by the second image reading apparatus 20 are allocated to any of the image storage sections 34, 44 and 54 for each order by the allocation section Allocation by the allocation section 63 is carried out by the following method. The allocation section 63 allocates digital images sent from the first image reading apparatus 10 or the second image reading apparatus 20 to a plurality of image control sections 31, 41 and 51, corresponding to the number of orders of the digital images, stored in the image storage section 34, 44 and 54 respectively corresponding to the instruction input keyboards 33, 43 and 53, by which the input of the printing condition instruction is not yet completed, (hereinafter, it will be referred to as the un-inputted amount), and corresponding to the average number of orders per unit time of the instruction input for the printing conditions from the instruction input keyboards 33, 43 and 53, (hereinafter, it is referred to as the input speed). (Due to this, the digital images are practically allocated to any of the plurality of image display sections 32, 42 and 52.) Further, in this case, when any of the image storage sections 34, 44 and 54 exists, into which input of the printing condition instruction is not yet completed by the instruction input keyboards 33, 43 and 53, and in which no digital image is stored, the digital images sent from the first image reading apparatus 10 or the second image reading apparatus 20 are allocated to that one of the image storage sections 34, 44 and 54, with priority.

The method to allocate the digital images sent from the first image reading apparatus 10 or the second image reading apparatus 20 to the plurality of the image control sections 31, 41 and 51, corresponding to an un-inputted amount S and input speed V, may employ any of the following methods: a method to allocate to an image control section in which a value (S/V) obtained by dividing the un-inputted amount S by the input speed V, is smaller than others; a method to allocate to an image control section in which a value ((S−S0)/V) obtained by dividing a value (S−S0), which is obtained by subtracting a predetermined value S0 from the un-inputted amount S, by the input speed V, is smaller than others; a method to allocate to an image control section in which the un-inputted amount S is not larger than the predetermined value S1 (S<S1) and the input speed V is largest; and a allocation method in which a case where the un-inputted amount S is not larger than a predetermined value S1 (S<S1) and the input speed V is larger than predetermined speed V1 (V>V1), is processed with the first priority; a case where the un-inputted amount S is not larger than a predetermined value S1 (S<S1) and the input speed V is not larger than predetermined speed V1 (V≦V1), is processed with the second priority; and a case where the un-inputted amount S is not smaller than a predetermined value S1 (S≧S1), is processed with the third priority.

The image storage sections 34, 44 and 54 store digital images from the first image reading apparatus 10 and the second image reading apparatus 20. The image control sections 31, 41 and 51 read the digital images stored in the corresponding image storage sections 34, 44 and 54 for each order in the transferring sequence. The image control sections 31, 41 and 51 display the reproduced images of the photographic document, read imagewise by the first image reading apparatus 10 or the second image reading apparatus 20, on the image display sections 32, 42 and 52, according to the read digital images.

The first image reading apparatus 10 transfers the order discrimination information for each order from the transmitting/receiving section 15 to the allocation section 63, and transfers the image frame discrimination information for each image frame, and a digital image, which is an read imagewise image of the corresponding image frame. This is the only difference from the previous examples. The second image reading apparatus 20 is also the same as above. The second image reading apparatus 20 transfers the order discrimination information for each order from the transmitting/receiving section 25 to the allocation section 63, and transfers the image frame discrimination information for each image frame and a digital image, which is an read imagewise image of the corresponding image frame. This is the only differece from the previous examples.

In the same manner as the image storage section in Example 1, the image storage sections 34, 44 and 54 store the digital image, obtained from the first image reading apparatus 10, together with the image frame discrimination information obtained from the first discrimination section 14 for each image frame, along with the order discrimination information, obtained from the first discrimination section 14 for each order. Further, the digital images from the second image reading apparatus 20 are also stored in the image storage sections, together with the image frame discrimination information, obtained by the second discrimination section 24 for each image frame, along with the order discrimination information obtained from the second discrimination section 24 for each order.

The image control sections 31, 41 and 51 measure the un-inputted amount S and the input speed V, and transfer the result of the measurement to the allocation section 63. This is the difference from the previous examples. The image control sections 31, 41 and 51 respectively raise a flag showing whether the input of the instruction for the printing conditions has been completed by the instruction input keyboards 33, 43 and 53, for each order of the digital images stored in the corresponding image storage sections 34, 44 and 54, and find the un-inputted amount S by counting the number of flags showing that the input of the instruction for printing conditions has not been completed yet by the instruction input keyboards 33, 43 and 53. Further, the image control sections 31, 41 and 51 store the number of orders, for the latest 60 minutes, for which the input of instruction for the printing conditions every minute has been completed by the instruction input keyboards 33, 43 and 53, and find the input speed from the number of orders, for which the input of instruction for the printing conditions has been completed by the instruction input keyboards 33, 43 and 53 for the latest 60 minutes.

Hereinafter, the downstream side of the information flowing path from the image control sections 31, 41 and 51, is the same as that in Example 1.

EXAMPLE 4

Figure 4:
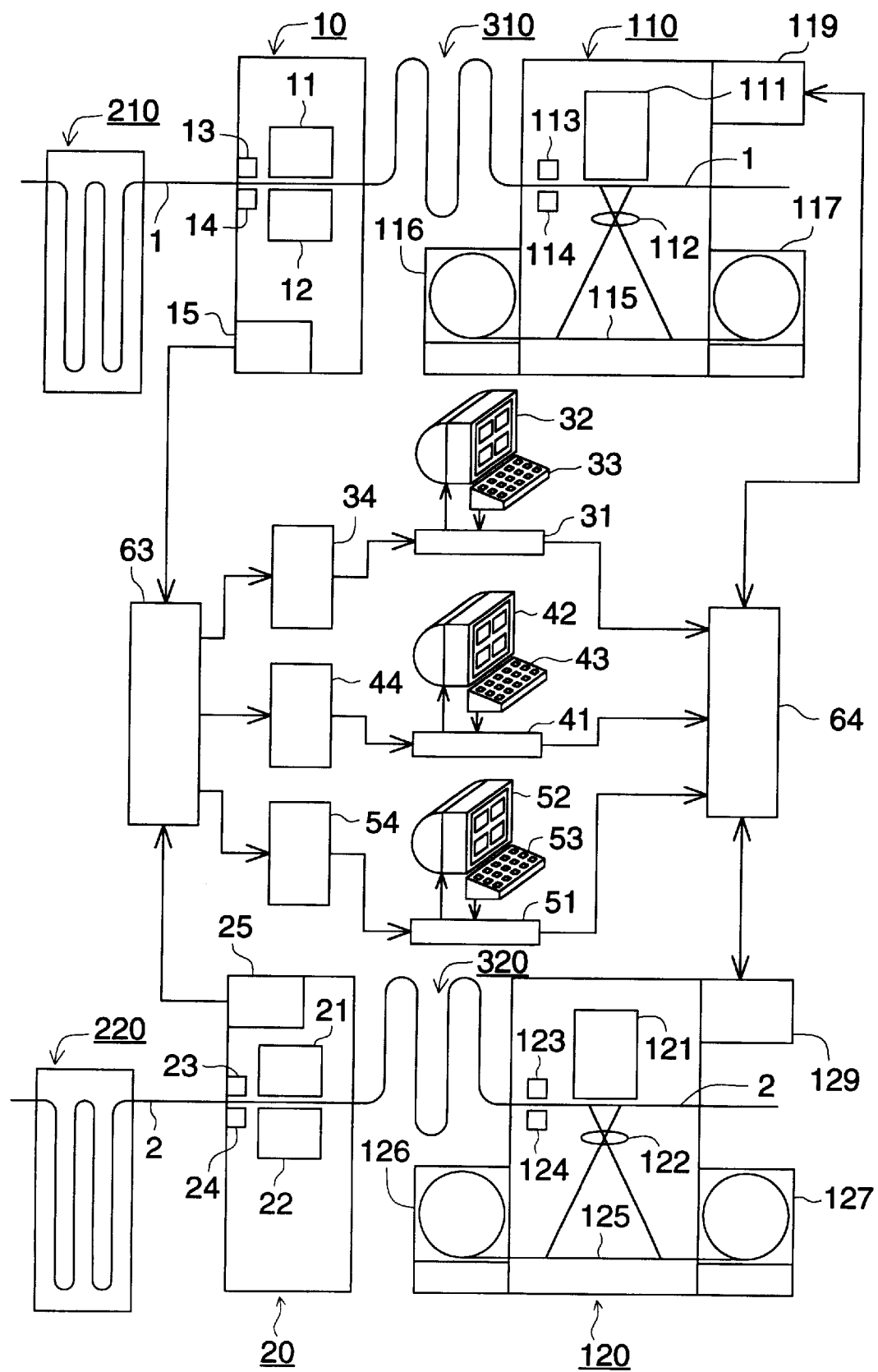
FIG. 4 is a view showing the general structure of a print production system of Example 4.

The present example is a variation of Example 2. The structure of a print production system of the present example is shown in FIG. 4. Referring to FIG. 4, only differences from Example 2, in the print production system of the present example, will be described below. Points, not described below, are entirely the same as those in Example 2.

Image storage sections 34, 44 and 45, which store the reproduced images, are respectively provided for image control sections 31, 41 and 51. The allocation section 63 is provided before these image storage sections 34, 44 and 45. The reproduced image obtained by imagewise reading by the first image reading apparatus 10, and that by the second image reading apparatus 20 are transferred to the allocation section 63 for each order. The reproduced image obtained by imagewise reading by the first image reading apparatus 10, and that by the second image reading apparatus 20 are allocated to any of the image storage sections 34, 44 and 54 for each order by the allocation section 63.

The allocation by the allocation section 63 is carried out by the following method. The allocation section 63 allocates digital images sent from the first image reading apparatus 10 or the second image reading apparatus 20 to a plurality of image control sections 31, 41 and 51, corresponding to an amount of orders of the digital images stored in the image storage section 34, 44 and 54 respectively corresponding to the instruction input keyboards 33, 43 and 53, by which the input of the printing condition instruction is not yet completed, (hereinafter, it is referred to as the un-inputted amount), and to the average speed of the instruction input for the printing conditions from the instruction input keyboards 33, 43 and 53, (hereinafter, it is referred to as the input speed). (Due to this, the digital images are practically allocated to any of the plurality of image display sections 32, 42 and 52.) Further, in this case, when any of the image storage sections 34, 44 and 54 exists, into which input of the printing condition instruction is not yet completed by the instruction input keyboards 33, 43 and 53, and in which no reproduced image is stored, the reproduced images sent from the first image reading apparatus 10 or the second image reading apparatus 20 are allocated to the image storage sections 34, 44 and 54, with priority.

The method to allocate the reproduced images sent from the first image reading apparatus 10 or the second image reading apparatus 20 to the plurality of the image control sections 31, 41 and 51, corresponding to an un-inputted amount S and input speed V, may be any of the following methods: a method to allocate the reproduced images to an image control section in which the value (S/V) obtained by dividing the un-inputted amount S by the input speed V, is smaller than others; a method to allocate the reproduced images to an image control section in which a value ((S−S0)/V) obtained by dividing a value (S−S0), which is obtained by subtracting a predetermined value S0 from the un-inputted amount S, by the input speed V is smaller than others; a method to allocate the reproduced images to an image control section in which the un-inputted amount S is not larger than a predetermined value S1 (S<S1) and the input speed V is largest; and an allocation method in which a case where the un-inputted amount S is not larger than a predetermined value S1 (S<S1) and the input speed V is larger than predetermined speed V1 (V>V1), is processed with the first priority; a case where the un-inputted amount S is not larger than a predetermined value S1 (S<S1) and the input speed V is not larger than predetermined speed V1 (V≦V1), is processed with the second priority; and a case where the un-inputted amount S is not smaller than a predetermined value S1 (S≧S1), is processed with the third priority.

The image storage sections 34, 44 and 54 store reproduced images from the first image reading apparatus 10 and the second image reading apparatus 20. The image control sections 31, 41 and 51 read the reproduced images stored in the corresponding image storage sections 34, 44 and 54 for each order in the transferring sequence. The image control sections 31, 41 and 51 display the reproduced images of the photographic document, read imagewise by the first image reading apparatus 10 or the second image reading apparatus 20, on the image display sections 32, 42 and 52, according to the read reproduced images.

The first image reading apparatus 10 transfers the order discrimination information for each order from the transmitting/receiving section 15 to the allocation section 63, and transfers the image frame discrimination information for each image frame, the reproduced image of the corresponding image frame, and the standard exposure control amount. This is the only difference from the previous examples. The second image reading apparatus 20 is also the same as above. The second image reading apparatus 20 transfers the order discrimination information for each order from the transmitting/receiving section 25 to the allocation section 63, and transfers the image frame discrimination information for each image frame, the reproduced image of the corresponding image frame, and the standard exposure control amount. This is the only difference from the previous examples.

In the same manner as the image storage section in Example 2, the image storage sections 34, 44 and 54 store the reproduced image, obtained from the first image reading apparatus 10, together with the image frame discrimination information, obtained from the first discrimination section 14, for each image frame, and the standard exposure control amount, along with the order discrimination information, obtained from the first discrimination section 14 for each order. Further, the reproduced image from the second image reading apparatus 20 is also stored in the image storage sections, together with the image frame discrimination information, obtained by the second discrimination section 24 for each image frame, and the standard exposure control amount, along with the order discrimination information obtained from the second discrimination section 24 for each order.

The image control sections 31, 41 and 51 measure the un-inputted amount S and the input speed V, and transfer the result of the measurement to the allocation section 63. This is the only difference from the previous example. The image control sections 31, 41 and 51 respectively raise a flag showing whether the input of the instruction for the printing conditions has been completed by the instruction input keyboards 33, 43 and 53, for each order of the digital images stored in the corresponding image storage sections 34, 44 and 54, and find the un-inputted amount S by counting the number of flags showing that the input of the instruction for printing conditions has not been completed yet by the instruction input keyboards 33, 43 and 53. Further, the image control sections 31, 41 and 51 store the number of orders, for the latest 60 minutes, for which the input of instruction for the printing conditions every minute has been completed by the instruction input keyboards 33, 43 and 53, and find the input speed from the number of orders which the input of instruction for the printing conditions has been completed by the instruction input keyboards 33, 43 and 53 for the latest 60 minutes.

Hereinafter, the downstream side of the information flowing path from the image control sections 31, 41 and 51, is the same as that in Example 2.

EXAMPLE 5

Figure 5:
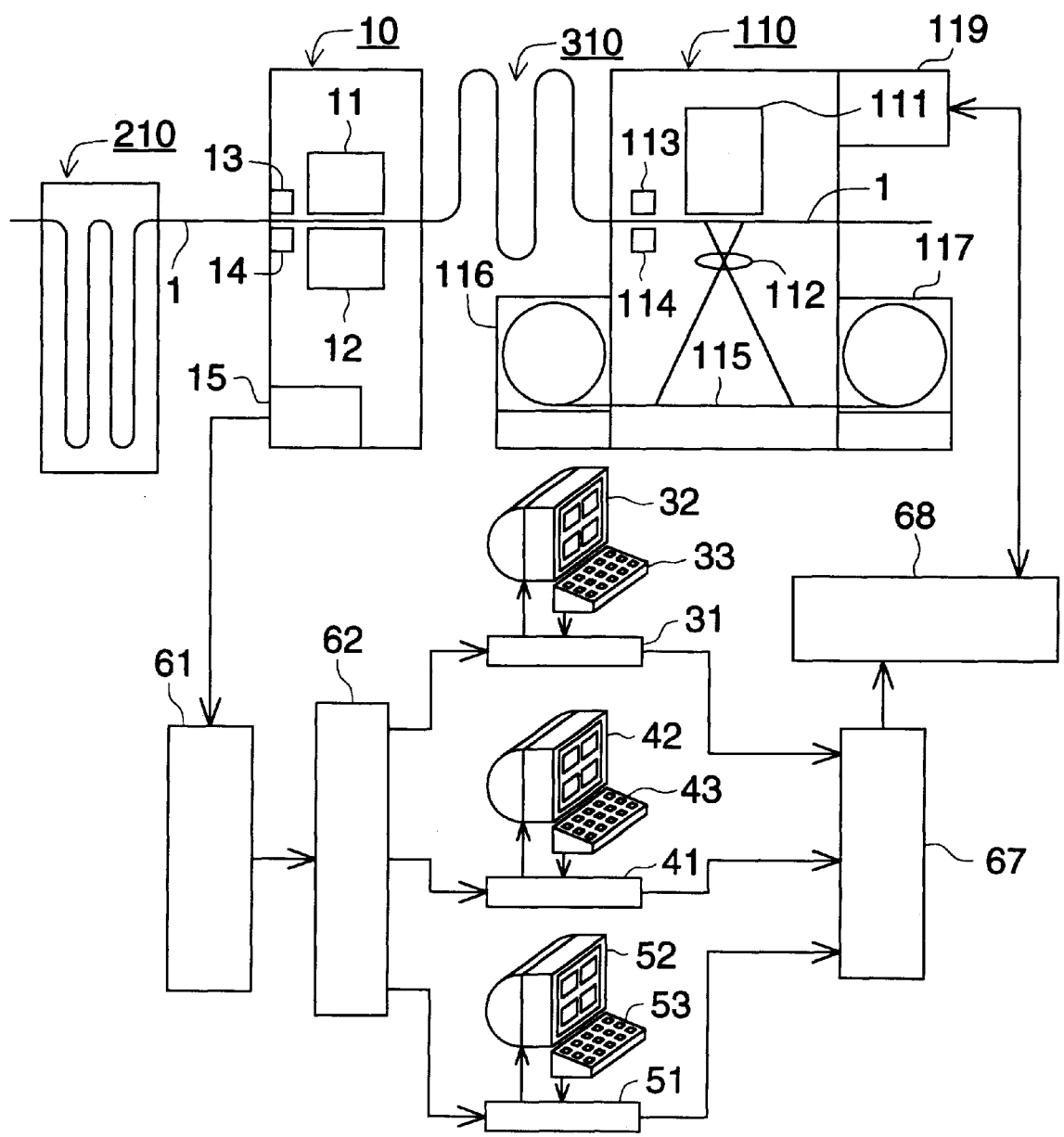
FIG. 5 is a view showing the general structure of a print production system of Example 5.

FIG. 5 is a view showing a general structure of a print production system of the present example. Referring to FIG. 5, the print production system of the present example will be described below. The print production system of the present example is a photograph production system having, generally, a development processing apparatus 210 to development-process an undeveloped photographic photosensitive material; an image reading apparatus 10 to obtain a digital image by imagewise reading a photographic document 1, in which the photographic photosensitive material, development-processed by the development processing apparatus, is used as the photographic document; and a printing apparatus 110 to print an image from the photographic document 1, read imagewise by the image reading apparatus 10, onto a printing photographic material 115.

The printing conditions of the printing apparatus 110 are determined when the reproduced image of the photographic document, read imagewise according to the digital image obtained by the image reading apparatus 10, is displayed, and instruction for the printing conditions with respect to the displayed photographic document, are inputted. This will be described as follows.

An image storage section 61 is provided in which the digital images obtained by imagewise reading by the image reading apparatus 10 are stored. This image storage section 61 can store the digital images from the image reading apparatus 10. An allocation section 62 allocates the digital images, stored in the image storage section 61, to image control sections 31, 41 and 51 for each order. The image control sections 31, 41 and 51 display the reproduced images of the photographic documents, read imagewise by the image reading apparatus 10, on image display sections 32, 42 and 52, according to the allocated digital images. Then, exposure correction amounts (an example of the instruction concerning the printing condition) with respect to the photographic document, which has been read imagewise by the image reading apparatus 10, and whose reproduced images have been displayed on the image display sections 32, 42 and 52, are inputted to the apparatus by instruction input keyboards 33, 43 and 53. The exposure correction amounts with respect to the photographic document, read imagewise by the first image reading apparatus 10, are sent to a printing condition determination section 67, wherein the exposure correction amounts have been inputted by the instruction input keyboard 33, 43 and 53. The printing condition determination section 67 determines an exposure control amount from the exposure correction amounts, sent as above, and sends the determined exposure control amount to a printing condition storage section 68. The printing condition storage section 68 stores the sent exposure control amount, and appropriately sends the stored exposure control amount to the printing apparatus 110.

In the present example, bar-code labels, on which order information to discriminate the order, is recorded, are stuck onto the leading photographic documents 1 and 2 of each order. The bar-code labels stuck on the leading photographic documents 1 and 2 of each order are read in the first discrimination section 14, the second discrimination section 24, the first printing discrimination section 114 or the second printing discrimination section 124, and the order information for each photographic document is thus obtained. Further, normally, a frame number code is provided on the edge portions of the photographic documents 1 and 2, and image frame discrimination information is obtained by reading the frame number code.

Next, the image reading apparatus 10 will be described. The image reading apparatus 10 imagewise reads the photographic document 1 to obtain an electronic image. The image forming section 12 imagewise reads the photographic document 1, illuminated by an image forming light source 11, and an analog electronic image is obtained and digitized. Characteristics of the image forming light source 11 and the image forming section 12 are corrected and a digital image is thus obtained. Then, a digital image, which is an image formed image of the image frame, read imagewise by this image forming section 12, is sent to a transmitting/receiving section 15. The image reading apparatus 10 is provided with a discriminating section 14, by which order discrimination information to discriminate the order of the photographic document 1, read imagewise by the image reading apparatus 10, is obtained for each order, and simultaneously, image frame discrimination information, to discriminate the image frame, is obtained. The discrimination section light source 13 is provided as the light source of the discrimination section 14. The order discrimination information, and the image frame discrimination information are sent from the discrimination section 14 to the transmitting/receiving section 15. Then, the order discrimination information is transmitted for each order, and the image frame discrimination information and the digital image which is an read imagewise image of the image frame, are transmitted for each image frame, from the transmitting/receiving section 15 to the image storage section 61.

The image storage section 61 stores the digital image, obtained from the image reading apparatus 10, together with the image frame discrimination information obtained from the discrimination section 14 for each image frame, and also along with the order discrimination information, obtained from the discrimination section 14 for each order.

When the allocation section 62 receives image transfer instruction signals from the image control sections 31, 41 and 51, the allocation section 62 transfers the digital image stored in the image storage section 61, for each order, to the image control sections 31, 41 and 51, which have transmitted image transfer instruction signals. In this case, the allocation section 62 transfers the digital image together with image frame discrimination information for each image frame of the digital image, stored in the image storage section 61. Further, it transfers the digital image together with the order discrimination information. In this connection, when plural orders of the digital images have not yet been transferred to the image storage section 61, the digital images stored in the image storage section 61, are transferred in the order of image formation.

The image control section 31, 41 and 51 determine a standard printing exposure amount for each image frame from one order of transferred information. Then, negative/positive-conversion is carried out for each image frame based on the standard printing exposure amount, and characteristics of the image display sections 32, 42 and 52, corresponding to the image control sections 31, 41 and 51, are corrected. The image control sections 31, 41 and 51 make the image for displaying a plurality of image frames in one order; this image is converted into an analog image; and display image signals are transferred to the image display sections 32, 42 and 52, corresponding to the image control sections 31, 41 and 51. The reproduced image of a print of the printing photosensitive material, printed from the read imagewise photographic document, is displayed on the corresponding image display section 32, 42 and 52. The image display sections 32, 42 and 52 display the reproduced images of plural image frames in one order, by display image signals. Thus, the image display sections 32, 42 and 52 display the reproduced images of the plural image frames of the photographic document belonging to one order, according to the digital images in one order which is selected by the allocation section 62.

The printing correction amounts for the reproduced images of the plural image frames of the photographic documents belonging to one order, displayed by the image display sections 32, 42 and 52, are received by the instruction input keyboards 33, 43 and 53 corresponding to the image display sections 32, 42 and 52. The printing correction amounts (the instruction concerning the printing conditions) which are inputted by the instruction input keyboards 33, 43 and 53, are respectively sent to the image control sections 31, 41 and 51 corresponding to the instruction input keyboards 33, 43 and 53. Then, the image control sections 31, 41 and 51 carrys out negative/positive-conversion for the image frames, according to this printing correction amount and the standard printing exposure amount, from the transferred digital image information of one order, so that characteristics of the image display sections 32, 42 and 52 respectively corresponding to the image control sections 31, 41 and 51, are corrected. Following that, the image, displaying a plurality of image frames in one order including the corresponding image frame, is again formed, converted to an analog image, and the display image signals are respectively transferred to the image display sections 32, 42 and 52 corresponding to the image control sections 32, 41 and 51. The image display sections 32, 42 and 52 display the reproduced images of the plurality of image frames in one order, by the display image signal. In this case, the printing correction amount is also displayed. Thus, the reproduced image of the image frame can be displayed, including the effects of the inputted printing correction amount.

Then, when the completion of the input of the exposure correction amount with respect to the image frame, being displayed on the corresponding image display sections 32, 42 and 52, is inputted from the instruction input keyboards 33, 43 and 53, the standard printing exposure amount, obtained by the image control sections 31, 41 and 51 corresponding to the instruction input keyboards 33, 43 and 53, and the printing correction amount, latest inputted by the instruction input keyboards 33, 43 and 53, are stored, and simultaneously, the reproduced images of other plural image frames, belonging to the same order, are displayed on the image display sections 32, 42 and 52 respectively corresponding to the instruction input keyboards 33, 43 and 53. Then, when the completion of the input of the exposure correction amounts with respect to the image frame, being displayed on the image display sections 32, 42 and 52, is inputted from the instruction input keyboards 33, 43 and 53, and when the input of the printing correction amount with respect to all image frames belonging to the same order, has been completed, the order discrimination information for the corresponding order, the image frame discrimination information for each image frame, the standard printing exposure amount obtained in the image control sections 31, 41 and 51, and the printing correction amount which has been stored and most recently inputted, are sent to the printing condition determination section 67.

Thus, after the instruction for the printing condition of the photographic document belonging to the same order has been inputted by the instruction input keyboards 33, 43 and 53, the keyboards 33, 43 and 53 receive the input of the instruction for the printing condition of the photographic document belonging to another order. Due to this, the instruction for the printing condition of the photographic document for each order is inputted, and control after this input, can be carried out for each order, resulting in easier information control.

The printing condition determination section 67 determines the printing exposure amount (printing condition) from the sent standard printing exposure amount and printing correction amount. Then, the order discrimination information of the corresponding order, and the image frame discrimination information and the obtained printing exposure amount (printing condition) for each image frame, are sent to a printing condition storage section 68.

The printing condition storage section 68 stores the printing exposure amount (printing condition information) determined by the printing condition determination section 67. The printing apparatus 110 conducts printing according to the printing condition information, stored in the printing condition information storage section 68. Due to this, the printing condition can be stored, and thereby, a time buffer is produced between the input of instruction for the printing condition and the actual printing operation. Accordingly, even if time for discrimination for each frame or each order fluctuates, the printing can be conducted according to the previously discriminated result. Thereby, the rate of waiting time for the discrimination for printing, can be reduced. Further, discrimination is conducted for the photographic document printed by a plurality of printing apparatus, and thereby, the rate of waiting time for the discrimination for printing, can be further reduced.

Next, the printing apparatus 110 will be described. The printing apparatus 110 prints a photographic document 1, illuminated by a printing light source 111, onto a printing photosensitive material 115 by image-forming using a lens section 112. The printing apparatus 110 is provided with a printing discrimination section 114 by which the order discrimination information to discriminate the order of the photographic document 1, to be printed by the printing apparatus 110, is obtained for each order, and simultaneously the image frame discrimination information to discriminate the image frame is obtained for each image frame. The printing discrimination section light source 113 is provided as the light source of the printing discrimination section 114. The order discrimination information for each order and the image frame discrimination information for each image frame are transferred from the printing discrimination section 114 to the printing condition storage section 68.

The printing condition storage section 68 transfers the corresponding printing exposure amount (printing condition information) to the printing apparatus 110, according to the order discrimination information transferred for each order, and the image frame discrimination information transferred for each image frame.

The printing apparatus 110 controls the printing light source 111 and the lens section 112 so that the printing exposure amount is equal to the transmitted one, and prints the photographic document 1 onto the printing photosensitive material 115. In this connection, the printing photosensitive material 115 is supplied from a magazine 116 in which unexposed printing photosensitive material is accommodated, and is wound into a magazine 117 in which exposed printing photosensitive material is accommodated. An accumulation mechanism 310 is provided between the image reading apparatus 10 and the printing apparatus 110 to allow for fluctuation of the exposure and discrimination times.

Due to the above description, the printing condition storage section 68 can store the printing condition information, and therefore, time allowance is produced between the input of instruction for the printing condition and the actual printing operation. Accordingly, even if discrimination time for each frame or each order fluctuates, the printing can be conducted according to the previously discriminated result. Thereby, the rate of waiting time for the discrimination for printing, can be reduced. Further, discrimination is conducted for the photographic documents printed by a plurality of printing apparatus, and thereby, the rate of waiting time for the discrimination for printing, can be further reduced, and the printing condition information can be controlled by the order discrimination information.

According to Item 1, even when the instruction for printing conditions is not quickly inputted, delays of the printing operation can be eliminated or reduced.

According to Item 2, a rate of waiting time for the discrimination of printing can be reduced.

According to Item 3, a rate of waiting time for the discrimination of printing can be reduced.

According to Item 4, image formation can be smoothly and continuously carried out.

According to Item 5, it can be prevented that different input contents in the same order results in fluctuation of density or color tone of the print, and further, information control can be easily conducted for each order.

According to Item 6, the information control can be easily conducted for each order in the succeeding processes.

According to Item 7, image formation can be smoothly and continuously carried out.

According to Item 8, the expected value for larger amounts of all instruction inputs per unit time is increased.

According to Item 9, the expected value for larger amounts of all instruction inputs per unit time is increased.

According to Item 10, the expected value for larger amounts of all instruction inputs per unit time is increased.

According to Item 11, the expected value for larger amounts of all instruction inputs per unit time is increased.

According to Item 12, the expected value for larger amounts of all instruction inputs per unit time is increased.

According to Item 13, it is prevented that allocation of the electronic image to an image display means corresponding to an unavailable instruction input means results in an un-discriminated situation for a long time, and the expected value for larger amounts of all instruction inputs per unit time is increased.

According to Item 14, electronic images can be controlled for each order.

According to Item 15, a rate of waiting time for judgement for printing can be reduced, and printing condition instruction information can be controlled by order discrimination information.

According to Item 16, a rate of waiting time for judgement for printing can be reduced, and printing condition information can be controlled by order discrimination information.

According to Item 17, a rate of waiting time for judgement for printing can be reduced, and printing condition instruction information can be controlled by image frame discrimination information.

According to Item 18, a rate of waiting time for judgement for printing can be reduced, and printing condition information can be controlled by image frame discrimination information.

According to Item 19, even when the instruction for printing conditions is not quickly inputted, a delay of the printing operation can be eliminated or reduced.

According to Item 20, amounts of all instruction inputs per unit time becomes larger.

According to Item 21, even when the instruction for printing conditions is not quickly inputted, a delay of the printing operation can be eliminated or reduced.

According to Item 22, a rate of waiting time for the discrimination of printing can be reduced.

According to Item 23, a rate of waiting time for the discrimination of printing can be reduced.

According to Item 24, image formation can be smoothly and continuously carried out.

According to Item 25, it can be prevented that different input contents in the same order results in fluctuation of density or color tone of the print, and further, the information control can be easily conducted for each order.

According to Item 26, the information control can be easily conducted for each order in the succeeding processes.

According to Item 27, image formation can be smoothly and continuously carried out.

According to Item 28, the expected value for larger amounts of all instruction inputs per unit time is more increased.

According to Item 29, the expected value for larger amounts of all instruction inputs per unit time is more increased.

According to Item 30, the expected value for larger amounts of all instruction inputs per unit time is more increased.

According to Item 31, the expected value for larger amounts of all instruction inputs per unit time is more increased.

According to Item 32, the expected value for larger amounts of all instruction inputs per unit time is more increased.

According to Item 33, it is prevented that allocation of the electronic image to an image display means corresponding to an unavailable instruction input means results in an un-discriminated situation for a long time, and the expected value for larger amounts of all instruction inputs per unit time is increased.

According to Item 34, electronic images can be controlled for each order.

According to Item 35, a rate of waiting time for judgement for printing can be reduced, and printing condition instruction information can be controlled by order discrimination information.

According to Item 36, a rate of waiting time for judgement for printing can be reduced, and printing condition information can be controlled by order discrimination information.

According to Item 37, a rate of waiting time for judgement for printing can be reduced, and printing condition instruction information can be controlled by image frame discrimination information.

According to Item 38, a rate of waiting time for judgement for printing can be reduced, and printing condition information can be controlled by image frame discrimination information.

According to Item 39, it is not necessary to set a developed photographic film to the image reading means, and further, it is not necessary to correct the obtained electronic images or printing conditions, corresponding to a combination of a large number of image forming conditions and a large number of development processing conditions.

Next, referring to FIGS. 6 and 7, an example to attain the second object will be described. Incidentally, parts shown in FIGS. 6 and 7, which have the same functions as those in FIG. 1, are denoted by the same parts number, and description about these parts will be omitted.

EXAMPLE 6

Figure 6:
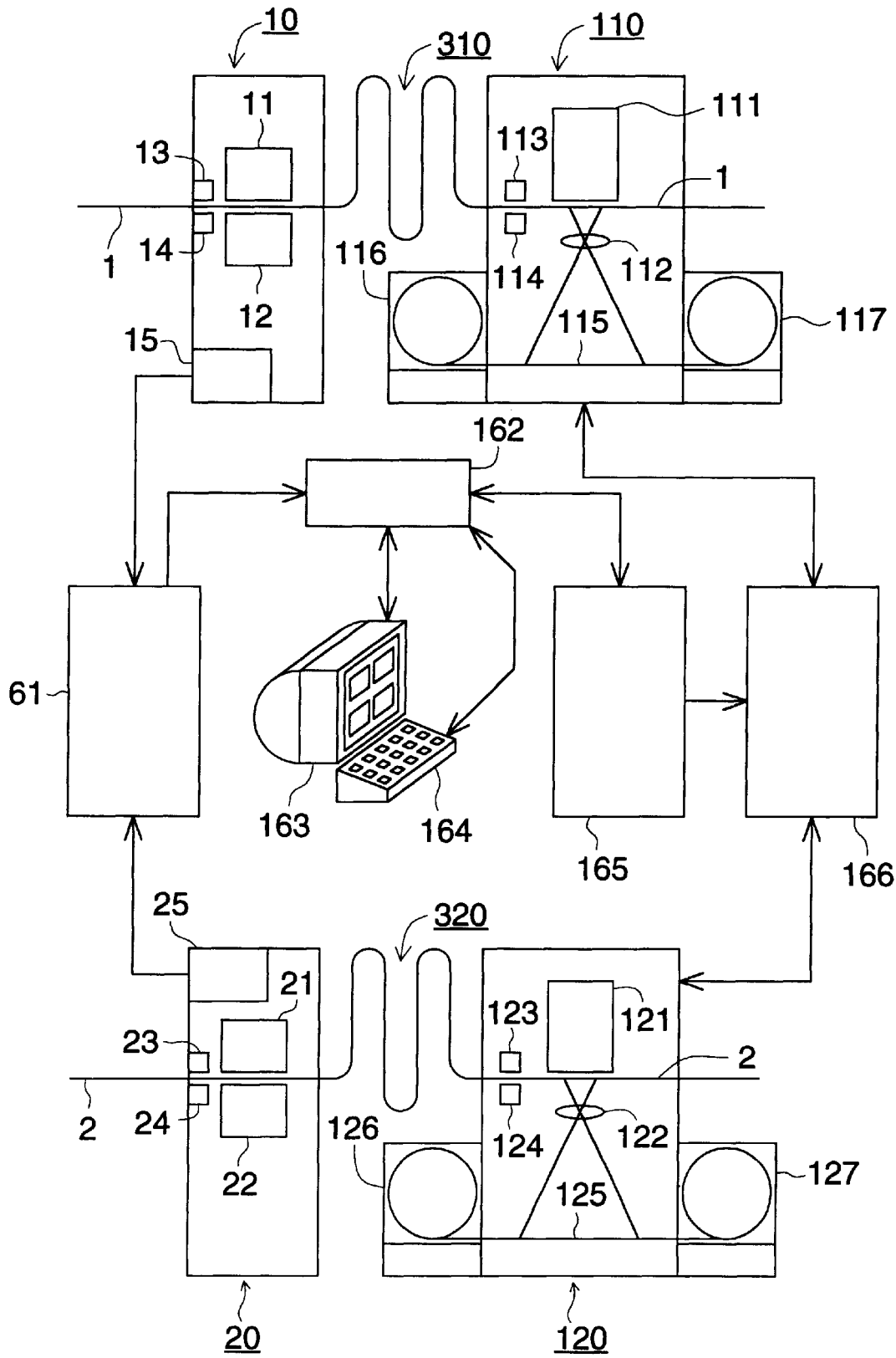
FIG. 6 is a view showing the general structure of a print production system of Example 6.

An general structural view of a print production system of the present example will be shown in FIG. 6. Hereinafter, the print production system of the present example will be described according to FIG. 6. The print production system of the present example has, generally, a first image reading apparatus 10 which image forms a photographic document 1 and obtains a digital image; a second image reading apparatus 20 which image forms a photographic document 2 and obtains a digital image; an image display section 163 which can display a reproduced image of the photographic document, image formed by the first image forming appraratus 10, according to the the digital image obtained by the first image forming apapratus 10, and which can display a reproduced image of the photographic document, image formed by the second image forming apapratus 20, according to the the digital image obtained by the first image forming apapratus 20; a instruction input keyboard 164 which can input the instruction for printing conditions for the photographic document, image formed by the first image forming apapratus 10 and displayed by the image display section 163, the instruction input keyboard 164 being also capable to input the instruction for printing conditions for the photographic document, image formed by the second image forming apapratus 20 and displayed by the image display section 163; a first printing apparatus 110 which prints an image from the photographic document 1, image formed by the first image reading apparatus 10 onto a printing photographic material 115, according to the instruction for printing conditions for the photographic document 1, image formed by the first image reading apparatus 10, the instruction for printing conditions having been inputted by the instruction input keyboard 164; and a second printing apparat us 110 which prints an image from the photographic document 2, image formed by the second image reading apparatus 20, onto a printing photographic material 125, according to the instruction for printing conditions for the photographic document 2, image formed by the second image reading apparatus 20, the instruction for printing conditions having been inputted by the instruction input keyboard 164. Due to the above structure, only one operator can judge the printing conditions for image frames, printed by a plurality of printing apparatus, resulting in a reduction of personnel expenses, and further, resulting in the uniform judgement for the printing conditions for the image frames printed by a plurality of printing apapratus.

An image storage section 61 is provided among the image display section 163, and the first image reading apparatus 10 and the second image reading apparatus 20. The image storage section 61 can store digital images from the first image reading apparatus 10 and the second image reading apparatus 20. The image display section 163 displays reproduced images of the photographic documents 1 and 2, according to digital images stored in the image storeŸage section 61. Due to this, the images, read imagewise by the first image reading apparatus 10 and the second image reading apparatus 20, can be stored as digital images. Thereby, sufficient time can be produced between the image forming operation and the display of the reproduced image. Therefore, even if the judgement time for each image frame or each order fluctuates, it is not necessary to conduct the next image forming oeration after judgement, resulting in smooth and continuous image formation. Further, the image formed images can be stored as digitala images, and photographic documents, read imagewise by a plaurality of image reading apparatus, are judged. Thereby, a rate of waiting condition for the image formation of the photographic documents for judgement, can be greatly reduced.

The image control section 162 selects digital images of one order from digital images of a plaurality of orders, stored in the image storage section 61, from the image storage section 61, based on order discriminaiton information. The image control section 162 determines a standard printing exposure amount for each image frame, from the information of digital images of one order. Then, negative/positive-conversion is carried out for each image frame based on the standard printing exposure amount, and characteristics of the image display section 163 are corrected. The image control section 162 makes the image for displaying a plurality of image frames in one order; this image is converted into analog one; and display image signals are transferred to the image display section 163. The image display section 163 displays the reproduced images of plural image frames in one order, by display image signals. Thus, the image display section 163 displays the reproduced images of the plural image frames of the photographic document belonging to one order, according to the digital images in one order which has been selected by the image control section 162. Due to these operations, digital images obtained by the first image reading apparatus 10 for each order, and digital images obtained by the second image reading apparatus 20, can be easily controlled.

The printing correction amounts for the reproduced images of the plural image frames of the photographic documents belonging to the one order, displayed by the image display section 163, are received by the instruction input keyboard 164. The printing correction amounts (the instruction concerning the printing conditions) which have been inputted by the instruction input keyboard 164, are sent to the image control section 162. Then, the image control section 162 carries out negative/positive-conversion for the image frames, according to this printing correction amount and the standard printing exposure amount, so that characteristics of the image display section 163 are corrected. Following that, the image, displaying a plurality of image frames in one order including the corresponding image frame, is formed again, converted to an analog image, and the display image signal is transferred to the image display section 163. The image display section 163 displays the reproduced images of the plurality of image frames in one order, by the display image signal. In this case, the printing correction amount is also displayed. Thus, the reproduced image of the image frame can be displayed, including the effects of the inputted printing correction amount.

In this connection, the image control section 162 determines the standard printing exposure amount using both of information of the photographic document 1, image formed by the first image reading apparatus 10, and infomation of the photographic document 1, image formed by the second image reading apparatus 20, as a common data base, in both cases in which the printing conditions for the photographic document 1, printed by the first printing apparatus 110, are determined, and in which the printing conditions for the photographic document 2, printed by the second printing apparatus 120, are determined. Due to this, the sytem can use the above data base, and an infomation amount is increased, thereby a more appropriate standard printing exposure amount can be obtained.

When the input of completion of the correction is conducted by the instruction input keyboard 164, reprodiction images of a plurality of other image frames belonging to the same order are displayed, and the standard printing exposure amount, obtained by the image control section 162, and the printing correction amount, latest inputted by the instruction input keyboard 164, are stored. Then, in the case where the input of complretion of corrction has been conducted by the instruction input keyboard 164, when the corrction of all image frames belonging to the same order has been completed, the order discrimination information of the corresponding order, the image frame discrimination information, for each image frame, the standard printing exposure amount, obtained by the image control section 162, and the printing correction amount, latest inputted by the instruction input keyboard 164, are sent to a printing condition determination section 165.

In the way described above, after the instruction input keyboard 164 has completed the input of instruction for the printing conditions for all image frames of the photographic document belonging to the same order, the instruction input keyboard 164 displays image frames of a photographic document belonging to another order, and receives the input of instruction for document beg conditions for the photographic document belonging to that order. Due to this operation, the instruction for the printing conditions for the photographic document is inputted for each order, and thereby, the control after this operation, can be carried out for each order, and the information control can be easily carried out.

The printing condition determination section 165 determines the printing exposure amount (printing condition) from the sent standard printing exposure amount and printing correction amount. Then, the order discrimination information of the corresponding order, and the image frame discrimination information and the obtained printing exposure amount (printing condition) for each image frame, are sent to a printing condition information storage section 166.

The printing condition information storage section 166 stores the printing exposure amount (printing condition information) determined by the printing condition determination section 165. The first printing apparatus 110 and also the second printing apparatus 120 conduct printing according to the printing condition information, stored in the printing condition information storage section 166. Due to this operation, the printing condition can be stored, and thereby, time allowance is produced between the input of instruction for the printing condition and the actual printing operation. Accordingly, even if time for discrimination for each frame or each order fluctuates, the printing can be conducted according to the previously discriminated result. Thereby, the rate of waiting condition for the discrimination for printing, can be reduced. Further, discrimination is conducted for the photographic documents printed by a plurality of printing apparatus, and thereby, the rate of waiting time for the discrimination for printing, can be further reduced.

Due to these operations, the printing condition information storage section 66 can store the printing condition information, and thereby, time allowance is produced between the input of instruction for the printing condition and the actual printing operation. Accordingly, even if time for discrimination for each frame or each order fluctuates, the printing can be conducted according to the previously discriminated result. Thereby, the rate of waiting condition for the discrimination for printing, can be reduced. Further, discrimination is conducted for the photographic documents printed by a plurality of printing apparatus, and thereby, the rate of waiting time for the discrimination for printing, can be further reduced, and further, the printing condition information can be controlled by the order discrimination information.

EXAMPLE 7

Figure 7:
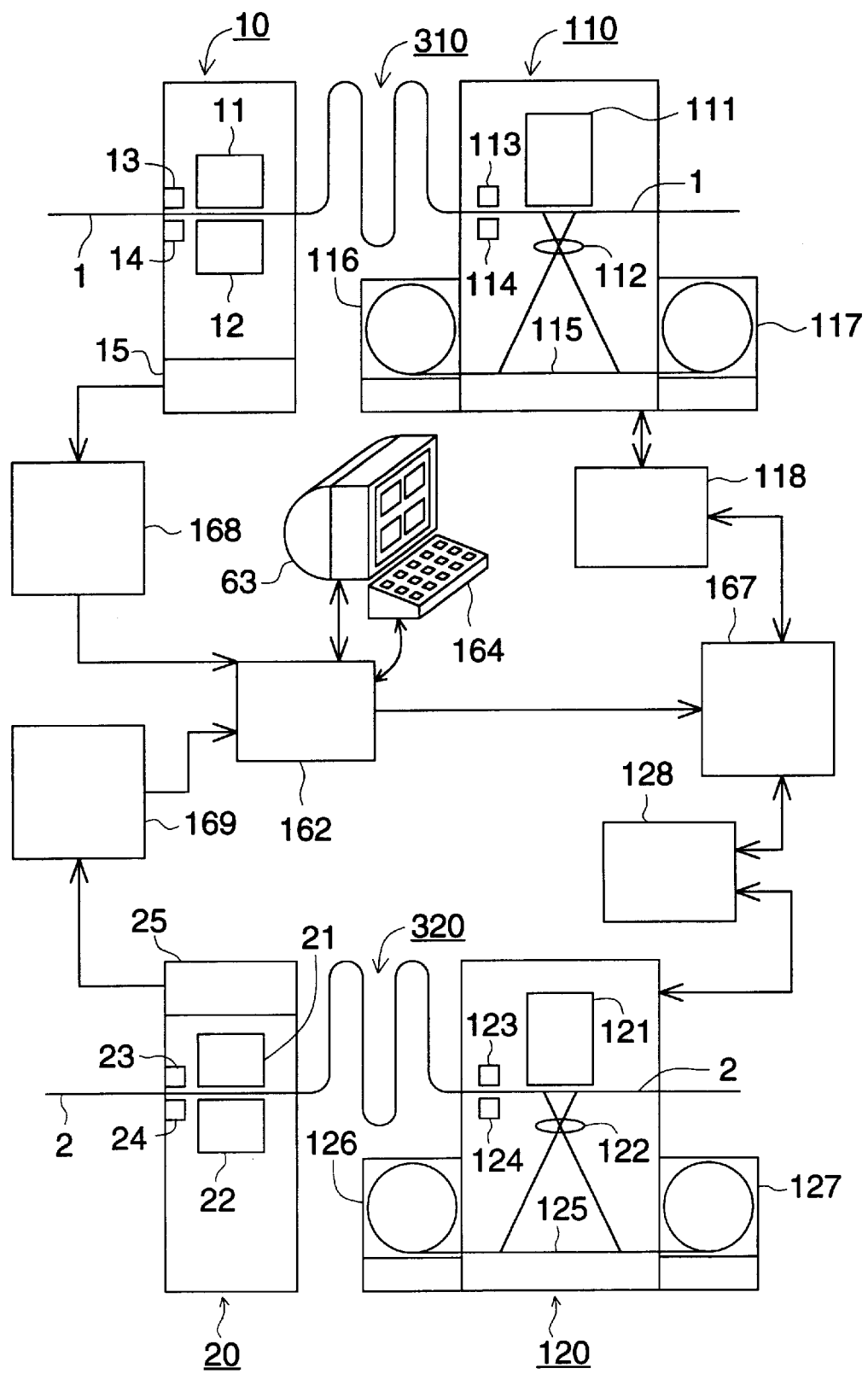
FIG. 7 is a view showing the general structure of a print production system of Example 7.

An general structural view of a print production system of the present example will be shown in FIG. 7. Hereinafter, the print production system of the present example will be described according to FIG. 7. The print production system of the present example has, generally, the same structure as that in Example 6.

In the present example, a first image storage section 168 is provided between the image display section 163, and the first image reading apparatus 10. A second image storage section 169 is provided between the image display section 163, and the second image reading apparatus 20. The first image storage section 168 can store digital images from the first image reading apparatus 10. The image display section 163 displays reproduced images of the photographic document 1, according to digital images stored in the first image storage section 168. The second image storage section 169 can store digital images from the second image reading apparatus 20. The image display section 163 displays reproduced images of the photographic document 2, according to digital images stored in the second image storage section 169. Due to this, the images, read imagewise by the first image reading apparatus 10 or the second image reading apparatus 20, can be stored as digital images. Thereby, sufficient time can be produced between the image forming operation and the display of the reproduced image. Therefore, even if the judgement time for each image frame or each order fluctuates, it is not necessary to conduct the next image forming oeration after judgement, resulting in smooth and continuous image formation. Further, the read imagewise images can be stored as digital images, and photographic documents, read imagewise by a plaurality of image reading apparatus, are judged. Thereby, a rate of waiting condition for the image formation of the photographic documents for judgement, can be greatly reduced.

The first image storage section 168 stores the reproduced image from the first image reading apparatus 10, together with the standard printing exposure amount for each image frame, and the image frame discrimination information, obtained by the first discrimination section 14, along with the order discrimination information, obtained for each order by the first discrimination section 14.

The second image storage section 169 stores the digital image from the second image reading apparatus 20, together with the standard printing exposure amount for each image frame, and the image frame discrimination information, obtained by the second discrimination section 24, along with the order discrimination information, obtained for each order by the second discrimination section 24.

The image control section 162 selects the reproduced image of one order from the digital images of a plurality of orders, stored in the first image storage section 168 or the second image storage section 169, according to the order discrimination information, from the first image storage section 168 or the second image storage section 169. Then, charqacteristics of the image display section 163 are corrected, according to the reproduced image. The image control section 162 makes the image for displaying a plurality of image frames in one order; this image is converted into analog one; and display image signals are transferred to the image display section 163. The image display section 163 displays the reproduced images of plural image frames in one order, by display image signals. Thus, the image display section 163 displays the reproduced images of the plural image frames of the photographic document belonging to one order, according to the digital images in one order which has been selected by the image control section 162. Due to these operations, digital images obtained by the first image reading apparatus 10 for each order, and digital images obtained by the second image reading apparatus 20, can be easily controlled.

A printing condition instruction informationstorage section 167 stores the sent exposure correction amount (printing condition designation information), and the first printing apparatus 110 and also the second printing apparatus 120 conduct printing, according to the printing condition instruction informationstored in the printing condition instruction informationstorage section 167. Due to this operation, the printing condition instruction informationcan be stored, and thereby, a time buffer is produced between the input of designation for the printing condition and the actual printing operation. Accordingly, even if time for discrimination for each frame or each order fluctuates, the printing can be conducted according to the previously discriminated result. Thereby, the rate of waiting condition for the discrimination for printing, can be reduced. Further, discrimination is conducted for the photographic documents printed by a plurality of printing apparatus, and thereby, the rate of waiting time for the discrimination for printing, can be further reduced.

The order discrimination information for each order, and the image frame discrimination information for each image frame, are transferred from the first printing discrimination section 114 of the first printing apparatus 110 to the first printing condition determination section 118.

The first printing condition determination section 118 transfers the order discrimination information, transferred for each order, and the image frame discrimination information, transferred for each image frame, to the printing condition instruction informationstorage section 167. The printing condition instruction informationstorage section 167 transfers the standard printing exposure amount of the corresponding image frame, and printing correction amount to the first printing condition determination section 118, from the order discrimination information transferred for each order, and the image frame discrimination information transferred for each image frame. Then, the first printing condition determination section 118 determines the printing exposure amount (printing condition), from the standard printing exposure amount of the corresponding image frame, and printing correction amount.

In the same way, the order discrimination information for each order, and the image frame discrimination information for each image frame, are transferred from the second printing discrimination section 124 of the second printing apparatus 120 to the second printing condition determination section 128.

The second printing condition determination section 128 transfers the order discrimination information, transferred for each order, and the image frame discrimination information, transferred for each image frame, to the printing condition instruction informationstorage section 167. The printing condition instruction informationstorage section 167 transfers the standard printing exposure amount of the corresponding image frame, and printing correction amount to the second printing condition determination section 128, from the order discrimination information transferred for each order, and the image frame discrimination information transferred for each image frame. Then, the second printing condition determination section 128 determines the printing exposure amount (printing condition), from the standard printing exposure amount of the corresponding image frame, and printing correction amount.

Due to these operations, the printing condition instruction informationstorage section 67 can store the printing condition designation information, and thereby, a time buffer is produced between the input of designation for the printing condition and the actual printing operation. Accordingly, even if time for discrimination for each frame or each order fluctuates, the printing can be conducted according to the previously discriminated result. Thereby, the rate of waiting condition for the discrimination for printing, can be reduced. Further, discrimination is conducted for the photographic documents printed by a plurality of printing apparatus, and thereby, the rate of waiting time for the discrimination for printing, can be further reduced. Further, the printing condition information can be controlled by the order discrimination information.

Then, the exposed photosensitive material for printing is wound in a magazine 117 or a magazine 127, developed by a developing machine which is not depected in the drawings, and is printed on a paper.

With item 40, it is possible to reduce labor cost, further, the judgment for printing conditions of image frames printed by the plural printing means can be homogenized.

With item 41, the image reading can be conducted smoothly continuously, and the occurrence rate of an event that the image reading is stopped for waiting the judgment can be appreciably reduced.

With item 42, the occurrence rate of an event that printing is stopped for waiting the judgment can be reduced.

With item 43, the occurrence rate of an event that printing is stopped for waiting the judgment can be reduced.

With item 44, information administration per each order as a unit can be conducted easily.

With item 45, information administration per each order as a unit can be conducted easily.

With item 46, the digital image obtained by the first image reading means and the digital image obtained by the second image reading means can be administrated for each oder as a unit.

With item 47, the occurrence rate of an event that printing is stopped for waiting the judgment can be further reduced, further, the printing condition instruction information can be administrated based on the order identification information.

With item 48, the occurrence rate of an event that printing is stopped for waiting the judgment can be further reduced, further, the printing condition instruction information can be administrated based on the order identification information.

With item 49, the occurrence rate of an event that printing is stopped for waiting the judgment can be further reduced, further, the printing condition instruction information can be administrated based on the order identification information.

With item 50, the occurrence rate of an event that printing is stopped for waiting the judgment can be further reduced, further, the printing condition instruction information can be administrated based on the order identification information.

With item 51, labor cost can be reduced accordingly, further, the judgment for printing conditions of image frames printed by the plural printing means can be homogenized.

With item 52, it is possible to conduct the judgment more efficiently, further, the judgment for printing conditions of image frames printed by the plural printing means can be homogenized.

With item 53, it is possible to conduct the judgment more efficiently.

With item 54, the occurrence rate of an event that printing is stopped for waiting the judgment can be further reduced, further, the printing condition instruction information can be administrated based on the order identification information.

With item 55, the occurrence rate of an event that printing is stopped for waiting the judgment can be further reduced.

What is claimed is:

1. A printing system for printing images based on original images on a plurality of photographic films each having identification information, comprising:

first reading means for reading said identification information from said plurality of photographic films;

second reading means for reading said original images from said plurality of photographic films to generate image data;

first memory means for storing said identification information and said image data in a form such that said identification information and said image data are correlated with each other;

first input means and second input means both for conducting input operations with respect to correction data for correcting said image data;

allocating means for allocating identification information and image data of a photographic film which are correlated with each other in said first memory to one of said first input means and said second input means in accordance with a completion of an input operation with respect to previously allocated image data;

second memory means for storing said correction data inputted by one of said first input means and said second input means in a form such that said correction data and said identification information are correlated with each other;

third reading means for reading said identification information from said photographic film from which said allocated identification information is read by said first reading means and said allocated image data are read by said second reading means;

printing means for printing images based on said original images on said photographic film from which said identification information is read by said third reading means; and control means for obtaining said correction data corresponding to said identification information read by said third reading means from said second memory means, and for controlling said printing means in accordance with said correction data.

2. The printing system of claim 1, further comprising accumulation means for accumulating said photographic films from which said original images are read by said second reading means and each said identification information is read by said first reading means but from which each said identification information is not yet read by said third reading means.

3. A printing system for printing images based on original images on a plurality of photographic films each having identification information, comprising:

first reading means for reading said identification information from said plurality of photographic films;

second reading means for reading said original images from said plurality of photographic films to generate image data;

first memory means for storing said identification information and said image data in a form such that said identification information and said image data are correlated with each other;

first input means and second input means both for conducting input operations with respect to correction data for correcting said image data;

allocating means for allocating identification information and image data of a photographic film which are correlated with each other in said first memory to one of said first input means and said second input means, based on (i) an un-inputted amount of previously allocated image data to each of said first and second input means, wherein the un-inputted amount of the previously allocated image data represents an amount of image data for which correction data are not inputted by one of the first input means and the second input means, and (ii) an input speed at which said correction data is input by each of said first and second input means;

second memory means for storing said correction data inputted by one of said first input means and said second input means in a form such that said correction data and said identification information are correlated with each other;

third reading means for reading said identification information from said photographic film from which said allocated identification information is read by said first reading means and said allocated image data are read by said second reading means;

printing means for printing images based on said original images on said photographic film from which said identification information is read by said third reading means; and control means for obtaining said correction data corresponding to said identification information read by said third reading means from said second memory means, and for controlling said printing means in accordance with said correction data.

4. The printing system of claim 3, wherein said allocating means conducts said allocation based on a time calculated from said un-inputted amount of the previously allocated image data and said input speed at which said correction data is input by each of said first and second input means.

5. The printing system of claim 3, further comprising accumulation means for accumulating said photographic films from which said original images are read by said second reading means and each said identification information is read by said first reading means, but from which each said identification information is not yes read by said third reading means.

* * * * *